(12) United States Patent  (10) Patent No.: US 9,234,908 B2
Shibata et al.  (45) Date of Patent: Jan. 12, 2016

(54) ROTATION DETECTING DEVICE AND BEARING EQUIPPED WITH ROTATION DETECTING DEVICE

(75) Inventors: Kiyotake Shibata, Iwata (JP); Toru Takahashi, Iwata (JP); Takayuki Norimatsu, Iwata (JP)

(73) Assignee: NTN CORPORATION, Osaka (JP)

( * ) Notice: Subject to any disclaimer, the term of this patent is extended or adjusted under 35 U.S.C. 154(b) by 346 days.

(21) Appl. No.: 13/378,238

(22) PCT Filed: Jun. 10, 2010

(86) PCT No.: PCT/JP2010/059839
§ 371 (c)(1),
(2), (4) Date: Dec. 14, 2011

(87) PCT Pub. No.: WO2010/147046
PCT Pub. Date: Dec. 23, 2010

(65) Prior Publication Data
US 2012/0086440 A1  Apr. 12, 2012

(30) Foreign Application Priority Data
Jun. 19, 2009  (JP) .................. 2009-146234

(51) Int. Cl.
*G01B 7/30* (2006.01)
*G01P 3/487* (2006.01)
(Continued)

(52) U.S. Cl.
CPC ............. *G01P 3/487* (2013.01); *G01D 5/145* (2013.01); *G01D 5/2451* (2013.01); *G01P 3/443* (2013.01); *F16C 41/007* (2013.01)

(58) Field of Classification Search
CPC ....... F16C 41/007; G01P 3/487; G01P 3/443; G01D 5/2451; G01D 5/145
USPC ................. 324/174, 207.11–207.26
See application file for complete search history.

(56) References Cited

U.S. PATENT DOCUMENTS 3,512,844 A * 5/1970 Stelzer .................. 303/115.3
4,454,763 A * 6/1984 Mahler .............. G01N 29/2487
73/639

(Continued)

FOREIGN PATENT DOCUMENTS

CN 1699081 11/2005
CN 1708692 12/2005

(Continued)

OTHER PUBLICATIONS

Japanese Office Action mailed Apr. 9, 2013 for corresponding Japanese Application No. 2009-146234.
(Continued)

*Primary Examiner* — Huy Q Phan
*Assistant Examiner* — Dustin Dickinson

(57) ABSTRACT

A rotation detecting device, which is compatible regardless of whether a process control device for processing an output signal of the rotation detecting device is standard one or new one having high input signal resolving power, and, also, a rotation detecting device equipped bearing assembly having such rotation detecting device, are provided. The rotation detecting device includes an encoder provided rotatably and having a plurality of circumferentially equidistantly arranged to-be-detected poles, and a sensor for detecting the to-be-detected poles. The use is made of a multiplying unit for multiplying the phase of the to-be-detected poles from an output of the sensor. The use is also made of a pulse outputting unit for receiving an output of the multiplying unit or both the output of the multiplying unit and an output of the sensor and output pulses having two multiplying powers different from each other.

17 Claims, 25 Drawing Sheets

(51) Int. Cl.
*G01D 5/14* (2006.01)
*G01D 5/245* (2006.01)
*G01P 3/44* (2006.01)
*F16C 41/00* (2006.01)

(56) References Cited

U.S. PATENT DOCUMENTS

| | | | |
|---|---|---|---|
| 4,466,189 A * | 8/1984 | Tobin, Jr. | 33/267 |
| 4,630,928 A | 12/1986 | Klingler et al. | |
| 5,127,035 A | 6/1992 | Ishii | |
| 5,873,658 A * | 2/1999 | Message | F16C 33/7886 324/207.25 |
| 5,900,727 A * | 5/1999 | Griffen et al. | 324/173 |
| 5,920,494 A | 7/1999 | Setbacken et al. | |
| 6,203,204 B1 * | 3/2001 | Carmichael | 384/448 |
| 6,653,829 B1 * | 11/2003 | Henry et al. | 324/207.21 |
| 6,700,367 B1 | 3/2004 | Santos et al. | |
| 6,948,856 B2 | 9/2005 | Takizawa et al. | |
| 7,249,891 B2 | 7/2007 | Aoki et al. | |
| 7,648,284 B2 | 1/2010 | Norimatsu | |
| 7,896,553 B2 | 3/2011 | Sahashi et al. | |
| 8,188,729 B2 | 5/2012 | Ito | |
| 2001/0009367 A1 * | 7/2001 | Seitzer et al. | 324/207.21 |
| 2002/0054719 A1 | 5/2002 | Takizawa et al. | |
| 2004/0013334 A1 * | 1/2004 | Landrieve | B62D 5/001 384/448 |
| 2004/0105603 A1 * | 6/2004 | Ohtsuki et al. | 384/448 |
| 2004/0239311 A1 | 12/2004 | Santos et al. | |
| 2005/0219962 A1 * | 10/2005 | Ollila | 369/13.11 |
| 2005/0254741 A1 * | 11/2005 | Norimatsu | 384/544 |
| 2005/0259903 A1 | 11/2005 | Takizawa et al. | |
| 2006/0039639 A1 | 2/2006 | Aoki et al. | |
| 2009/0051349 A1 * | 2/2009 | Fruehling et al. | 324/173 |
| 2009/0190872 A1 | 7/2009 | Sahashi et al. | |
| 2009/0256615 A1 * | 10/2009 | Suzuki | 327/298 |
| 2010/0052662 A1 * | 3/2010 | Ito | 324/207.25 |

FOREIGN PATENT DOCUMENTS

| | | |
|---|---|---|
| CN | 1993562 | 7/2007 |
| DE | 288221 | 3/1991 |
| JP | 5-322909 | 12/1993 |
| JP | 7-21660 | 4/1995 |
| JP | 11-2547 | 1/1999 |
| JP | 2001-85979 | 3/2001 |
| JP | 2002-541485 | 12/2002 |
| JP | 2003-42151 | 2/2003 |
| JP | 2008-111480 | 5/2008 |

OTHER PUBLICATIONS

International Search Report of PCT/JP2010/059839 mailed Sep. 14, 2010.
Extended European Search Report issued Nov. 13, 2012 in corresponding European Patent Application No. 10789421.4.
International Preliminary Report on Patentability mailed Jan. 26, 2012 issued in corresponding International Patent Application No. PCT/JP2010/059839.
Chinese Office Action issued Jun. 11, 2014 in corresponding Chinese Patent Application No. 201080027203.
Chinese Office Action issued Apr. 10, 2015 in corresponding Chinese Patent Application No. 201080027203.X.
Chinese Office Action issued Nov. 19, 2014 in corresponding Chinese Patent Application No. 201080027203.X.

* cited by examiner

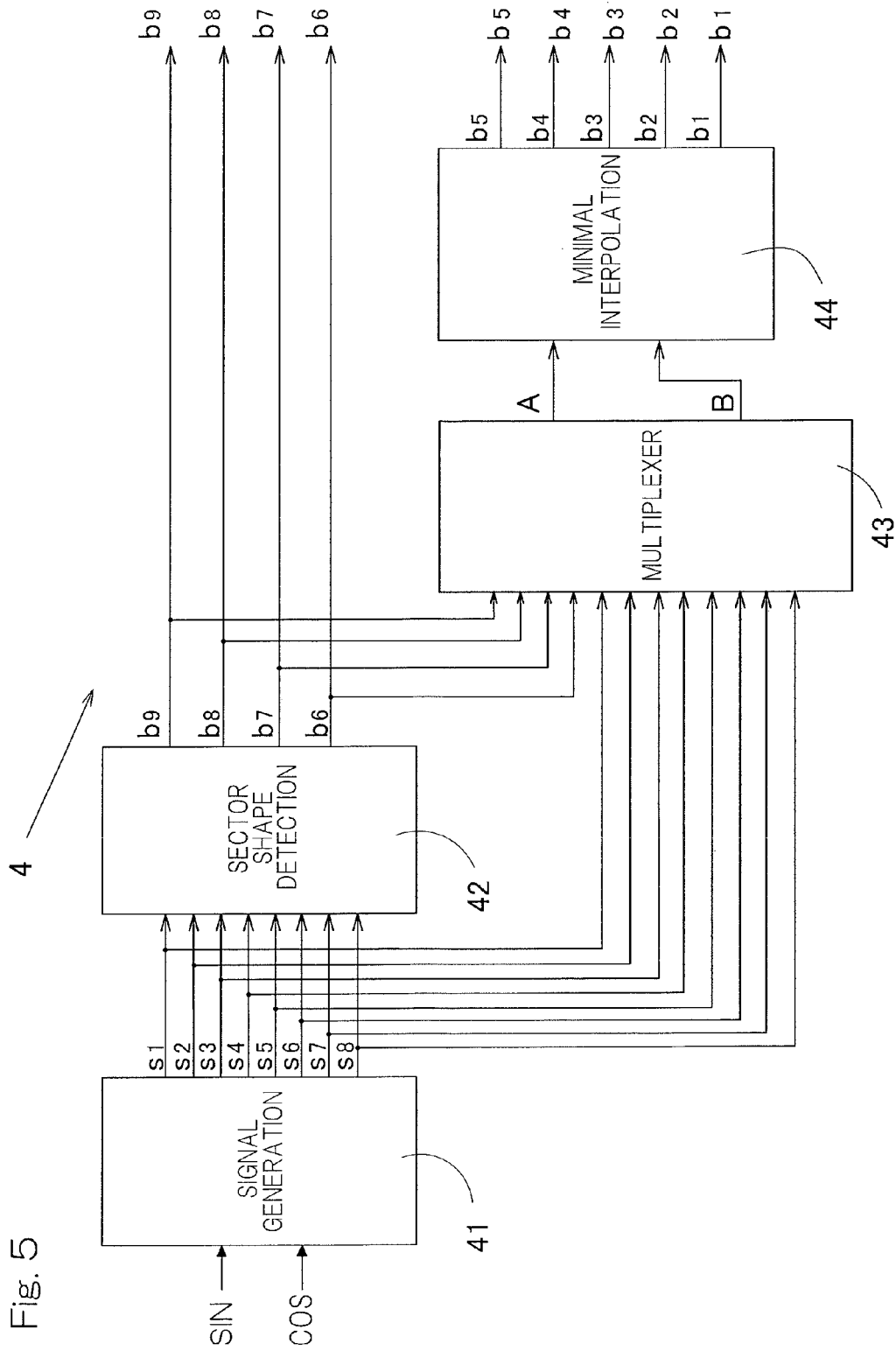

ROTATION DETECTING DEVICE AND BEARING EQUIPPED WITH ROTATION DETECTING DEVICE

CROSS REFERENCE TO RELATED APPLICATIONS

This application claims the benefit under 35 U.S.C. Section 371, of PCT International Application No. PCT/JP2010/059839, filed Jun. 10, 2010, which claimed priority to Japanese Application No. 2009-146234, filed Jun. 19, 2009 in the Japanese Patent Office, the disclosures of which are hereby incorporated by reference.

BACKGROUND OF THE INVENTION

1. Field of the Invention

The present invention relates to a rotation detecting device, which is used with vehicle wheels or various machines and equipments for detecting the rotation or the angle of rotation thereof, and a rotation detecting device equipped bearing assembly having the rotation detecting device mounted thereon.

2. Description of Related Art

For accurately detecting a rotating condition of a rotating body of, for example, an automotive vehicle or a railway vehicle, demands have been made to secure a highly accurate rotation signal of a high resolution. In a wheel support bearing assembly for rotatably supporting a vehicle wheel relative to a vehicle body, an ABS sensor is generally employed for controlling an anti-lock brake system, that is, for the ABS control. This ABS sensor available at this time has an insufficient resolving power. If a rotation detection at a high resolving power is possible with such a sensor, it can be used in a sophisticated vehicle control such as, for example, automated driving, automated drive assistance, safety control or the like in the future. As the rotation detecting device, such a circuit system has hitherto been made in which a multiplication signal having a high resolving power is obtained from a rotation signal input of sin and cos detected by a magnetic sensor. In this respect, see the patent document 1 listed below. A schematic construction of this rotation detecting device is shown in FIG. 34 in the form of a block diagram.

PRIOR ART DOCUMENT

[Patent Document 1] JP Laid-open Patent Publication No. 2002-541485

SUMMARY OF THE INVENTION

Since the behavior of an automotive vehicle can be detected in detail with the multiplication signal when the rotation detecting device disclosed in the patent document 1 listed above is mounted on a wheel support bearing assembly, a further sophisticated vehicle control can be made possible. However, since an output signal resolving power of the related art rotation detecting device differs from an input signal resolving power of the standard ABS control device currently employed, it is not possible to use the related art rotation detecting device in the form as connected with the standard ABS control device. In order to make it possible to connect with each other, a new type of device, in which the input signal resolving power as the ABS control device is increased, is necessary. In other words, with the ABS control device, input data increase to the number of data which is a multiplication of the number of conventional data. By way of example, while in a conventional rotation detecting device, revolutions of an automotive vehicle is detected with a detected rotation signal of 48 pulses per one complete rotation of the vehicle wheel, assuming that the multiplying power with the rotation detecting device is 40, one complete rotation of the vehicle wheel will be detected with the detected rotation signal of 1920 pulses. For this reason, a problem will arise, in which input data to the ABS control device per unitary time particularly during a high speed rotating range will become so vast that the standard ABS control device will fail to process or the processing will be delayed.

Also, in order for the rotation detecting device to be compatible with the ABS control device, mounted on the automotive vehicle, regardless of whether the ABS control device is of standard type or whether it is of a new type, there is the necessity that as the rotation detecting device, the wheel support bearing assembly be equipped with both the conventional rotation detecting device and the rotational detecting device having the high resolving power as described above. This, however, leads to such a problem that increased space, cost and weight are inevitable.

An object of the present invention is to provide a rotation detecting device, which is compatible regardless of whether a process control device for processing an output signal of the rotation detecting device is the standard one or whether such process control device is a new process control device having a high input signal resolving power, and also to provide a rotation detecting device equipped bearing assembly equipped with such rotation detecting device.

Another object of the present invention is to provide the rotation detecting device capable of selecting a detection resolving power in dependence on the rotational speed of a rotating body of an object to be detected and the detected rotation signal can therefore be processed with the process control device having the standard input signal resolving power, and also to provide the rotation detecting device equipped bearing assembly equipped with such rotation detecting device.

In order to accomplish the foregoing objects of the present invention, the present invention in accordance with a first aspect thereof provides a rotation detecting device including an annular encoder provided rotatably and having a plurality of to-be-detected poles, that are arranged equidistantly in a direction circumferentially thereof, and a sensor for detecting the to-be-detected poles of the encoder, characterized in that the use is made of a multiplying unit for multiplying a phase of the to-be-detected poles based on an output of the sensor, and a pulse outputting unit, to which an output of the multiplying unit or the output of the multiplying unit and a pulse generated by the sensor is/or inputted and which outputs a pulse having at least two multiplying powers different from each other. In other words, the pulse outputting unit referred to above outputs a rotation pulse having two or more resolving powers.

According to this construction, the multiplied pulse of a high multiplying power having a phase within the to-be-detected poles of the encoder multiplied is generated from the multiplying unit and, based on this multiplied pulse, pulses having two or more types of different multiplying powers are outputted in the pulse outputting unit. Because of this, regardless of whether the process control device for processing the output signal of the rotation detecting device is standard or whether it is a new one having a high input signal resolving power, correspondence can be made by selecting the pulse of a corresponding resolving power (multiplying power) from pluralities of types of the rotation pulses and, accordingly, the rotation detection can be accomplished accurately.

Also, by selecting the detection resolving power in accord with the rotational speed of the rotating body of the object to be detected, the detected rotation signal can be processed even with the process control device of the standard input signal resolving power. In other words, where the rotation detecting device is employed for detecting the rotation of the vehicle wheel while having been mounted on, for example, a wheel support bearing assembly, if the signal processing capability of a vehicle ABD control device, which is the process control device, is standard, it may occur that, when the rotation pulse of the high resolving power is inputted during a high speed travel of the automotive vehicle, the ABS control device will be unable to process the input signal or the processing will be delayed. In such case, if a method of use, in which input is made by selecting and inputting the rotation pulse of a small multiplying power during the high speed travel, but selecting and inputting the rotation pulse of a high multiplying power during a low speed travel, is adopted, the signal processing can be accomplished sufficiently even with the standard ABS control device.

In the rotation detecting device according to one embodiment of the first aspect of the present invention, the pulse outputting unit may generate all pulses to be outputted therefrom based on an output of the multiplying unit.

In the rotation detecting device according to one embodiment of the first aspect of the present invention, the pulse outputting unit may be such that the multiplication factor of the output pulses of the smallest multiplying power is one.

In the rotation detecting device according to one embodiment of the first aspect of the present invention, the pulse outputting unit may include an ordinary output section for outputting pulses, obtained from a detection output of the sensor, without passing through the multiplying unit, and a high resolution pulse output section for outputting pulses generated from the output of the multiplying unit. In the case of this construction, the ordinary pulse output section does not require a frequency division of the pulse after the multiplication and, therefore, the structure can be simplified.

In the rotation detecting device according to one embodiment of the first aspect of the present invention, the use may be made of a multiplying power changing unit for changing from the outside a multiplying power of the pulses to be outputted by the pulse outputting unit. Accordingly, it is possible to output the pulse of a multiplying power that accommodates a change in rotational speed such as resulting from a change in, for example, vehicle travelling speed in use.

In the rotation detecting device according to one embodiment of the first aspect of the present invention, the number of the encoder may be one, in which case a detection output of the sensor that detects the to-be-detected poles of the encoder is inputted to the multiplying unit. In the case of this construction, for outputting the rotation pulse of the high resolving power (high multiplying power) and the rotation pulse of a low resolving power (low multiplying power) simultaneously, there is no need to use two types of the sensor and an undesirable increase in space and weight can be suppressed.

In the rotation detecting device according to one embodiment of the first aspect of the present invention, the encoder referred to above may be a magnetic encoder.

In the rotation detecting device according to one embodiment of the first aspect of the present invention, the sensor may include a line sensor having sensor elements arranged along a direction of arrangement of the to-be-detected poles of the encoder and generate two sinusoidal signals of the different phases through calculation, to detect a phase within one to-be-detected pole. In the case of this construction, an undesirable influence which may be brought about by strains and/or noises in the to-be-detected pole pattern is suppressed and, therefore, the phase of the encoder can be detected with a high accuracy.

In the rotation detecting device according to one embodiment of the first aspect of the present invention, the pulse of at least one type of the multiplying power, to be generated by the pulse outputting unit, may be rendered to be a phase difference signal of A and B phases displaced 90° in phase relative to each other. If in this way for the rotation pulses of the same multiplying power, the phase difference signal of the A and B phases that are displaced 90° in phase from each other are outputted, the detection of the rotational direction become possible. Where this rotation detecting device is mounted on the wheel support bearing assembly for an automotive vehicle, forward and rearward movements of the automotive vehicle can be detected.

In the rotation detecting device according to one embodiment of the first aspect of the present invention, the sensor, the multiplying unit and the pulse outputting unit may be integrated in a common integrated circuit. This integrated circuit is an IC chip. Accordingly, mounting of the rotation detecting device on the wheel support bearing assembly can be accomplished compactly and, hence, the weight can be reduced.

In the rotation detecting device of any one of the foregoing constructions according to the first aspect of the present invention, the sensor may include a sensor element unitary component which is in its entirety integrated; the multiplying unit and the pulse outputting unit are integrated in a common integrated circuit; and the integrated circuit having the multiplying unit and the sensor element unitary component may then be arranged circumferentially on and mounted on an arcuate substrate confronting axially the encoder and formed as a printed circuit substrate extending in the form of a strip in a direction along a circumferential direction coaxial with a center of the encoder. The integrated circuit referred to above is an IC chip. Mounting of the sensor element unitary component and the integrated circuit of the multiplying unit on the same arcuate substrate is effective to compactize the rotation detecting device and, hence, the various circuits and the sensor element unitary component can be arranged in a limited available space.

The present invention in accordance with a second aspect thereof provides a rotation detecting device including an annular encoder provided rotatably and having a plurality of to-be-detected poles, that are arranged equidistantly in a direction circumferentially thereof, and a sensor for detecting the to-be-detected poles of the encoder, characterized in that the encoder referred to above is a magnetic encoder and in that a plurality of integrated circuits, including a sensor for detecting the to-be-detected poles of the magnetic encoders, a multiplying unit for multiplying the phase of the to-be-detected poles from an output of the sensor, and a pulse outputting unit for receiving an output of the multiplying unit and outputting a pulse, are provided, those plural integrated circuits being of a type in which magnifying powers of output pulses relative to the number of magnetic pole pairs of the magnetic encoder are differentiated from each other. Each of the integrated circuits referred to above is an IC chip which will become a magnetic sensor integrated circuit. Of the plural integrated circuits having the multiplying unit, the multiplying power of the pulse having the lowest multiplying power is set to, for example, 1.

In the case of the construction described above, since the use is made of the plural integrated circuit having the multiplying unit so that output pulses of multiplying powers different from each other are outputted, regardless of whether the process control device for processing the output signal of the rotation detecting device is standard or whether it is a new one having a high input signal resolving power, correspondence can be made by selecting the pulse of a corresponding resolving power (multiplying power) from pluralities of types of the rotation pulses and, accordingly, the rotation detection can be accomplished accurately. In the case of this construction, although each of the plural integrated circuits employed is of a type having the multiplying unit and the pulse outputting unit, if the multiplying power of the multiplying unit is made changeable by an input from the outside of the integrated circuits, the same specification are to be used for the integrated circuits of the multiplying units of the various multiplying powers and settings of those multiplying units are differentiated from each other. For this purpose, even where the pulse of, for example, 1 in multiplying power is outputted, the number of component parts can be reduced as compared with the case, in which the integrated circuit having no multiplying unit and the integrated circuit having the multiplying unit are employed, and, consequently, it leads to a reduction in cost.

Even in the rotation detecting device according to the second aspect of the present invention, the integrated circuits may be mounted on an arcuate substrate, which is a printed circuit substrate extending in the form of a strip in a direction along a circumferential direction coaxial with a center of the magnetic encoder in face to face relation with an axial direction of the encoder, while being circumferentially arranged. Positioning of the plural magnetic sensor integrated circuits on the same arcuate substrate makes it possible to compactize the rotation detecting device as a whole and, therefore, the various circuits and the sensor element unitary component can be arranged in a limited available space.

In the rotation detecting device according to any one of the first and second aspects of the present invention, the integrated circuit referred to above may be covered with a molding material. Also, the molding material referred to above may be a resin. By so doing, it is possible to secure a waterproofing and an impact resistance of the rotation detecting device.

In the rotation detecting device according to any one of the first and second aspects of the present invention, the use may be made of a voltage to electric current converting circuit for converting into one of pulses outputted by the pulse outputting unit, such one of the pulses having the smallest multiplication factor of all those pulses. In this case, the voltage to electric current converting circuit alternately may output a pulse signal of 7 mA in current value and a pulse signal of 14 mA in current value as the electric current output. Thereby, correspondence can be made to the input signal mode of the process control device for processing the output signal of the rotation detecting device.

The rotation detecting device equipped wheel support bearing assembly of the present invention is of a type in which the rotation detecting device of any one of the previously described construction is incorporated in the wheel support bearing assembly. According to this construction, regardless of whether the process control device for processing the output signal of the rotation detecting device is standard or whether it is a new one having a high input signal resolving power, the rotation detection can be accomplished accurately. Also, where the rotation detecting device equipped bearing assembly is a wheel support bearing assembly, the detection resolving power can be selected in dependence with the vehicle traveling speed and even the standard ABS control having the standard input signal resolving power can therefore process the detected rotation signal.

In the rotation detecting device equipped bearing assembly of the present invention, the bearing assembly is a wheel support bearing assembly for supporting a vehicle driven wheel, in which case the use may be made of a cap, the sensor being covered by this cap. In the case of this construction, an undesirable ingress of muddy water or the like from the outside can be prevented and, therefore, the reliability of the rotation detecting device can be increased. In the rotation detecting device equipped bearing assembly of the present invention, the bearing assembly is a wheel support bearing assembly for supporting a vehicle drive wheel, in which case a bearing end portion of a bearing space, delimited between an outer member and an inner member rotatable relative to each other through rolling elements, is sealed by a sealing to device, the sensor being provided at a location inwardly of the bearing with respect to the sealing device. Even in the case of this construction, an undesirable ingress of muddy water or the like from the outside can be prevented and, therefore, the reliability of the rotation detecting device can be increased.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

FIG. 5 is a block diagram showing one example of a structure of a multiplying unit employed in the rotation detecting device;

DETAILED DESCRIPTION OF THE PREFERRED EMBODIMENTS

Figure 1:
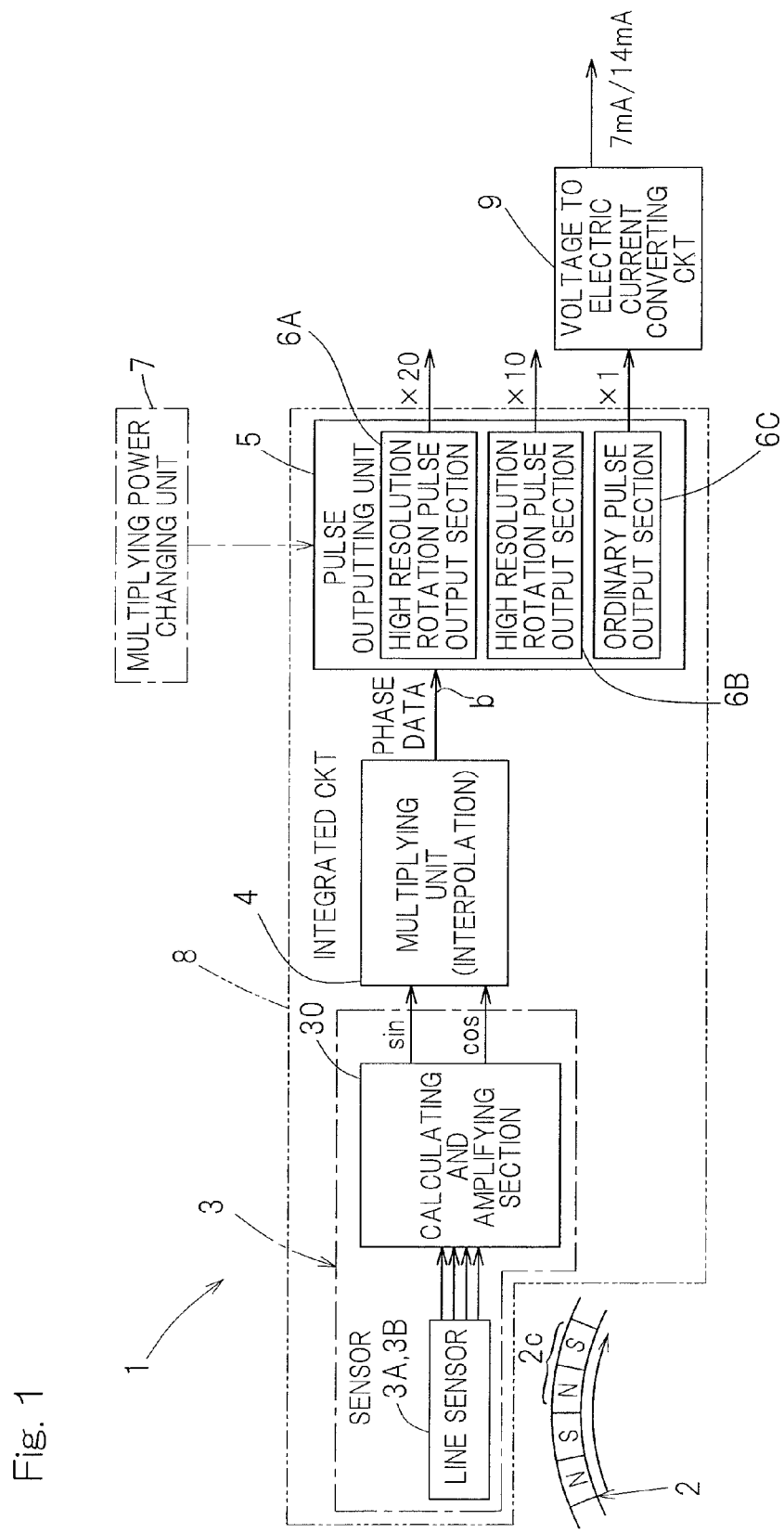
FIG. 1 is a block diagram showing a schematic structure of a rotation detecting device according to a first embodiment of the present invention.

A first embodiment will be described in detail with particular reference to FIGS. 1 to 5. The rotation detecting device 1 designed in accordance with this first embodiment includes a ring shaped encoder 2 having a plurality of to-be-detected poles arranged equidistantly in a direction circumferentially thereof, a sensor 3 for detecting the to-be-detected poles of the encoder 2, a multiplying unit 4 for multiplying a phase within the to-be-detected poles based on an output of the sensor 2 with a multiplication factor N to generate a multiplication pulse b, and a pulse outputting unit 5 for outputting a rotation pulse based on the multiplication pulse b generated from the multiplying unit 4, the rotation pulse having at least two multiplying powers that differ from each other.

Figure 2A:
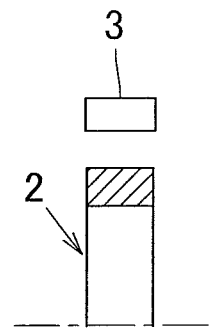
FIG. 2A is a fragmentary sectional view showing one example of a structure of an encoder employed in the rotation detecting device.
Figure 2B:
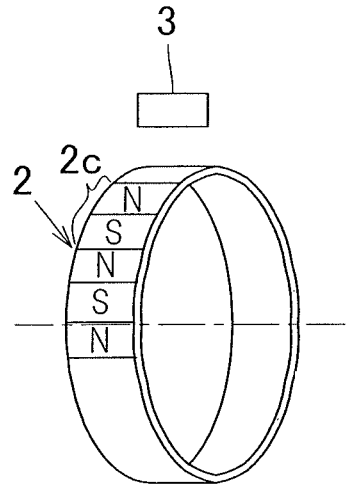
FIG. 2B is a perspective view of the encoder.

As shown in, for example, FIGS. 2A and 2B in a fragmentary sectional view and a perspective view, respectively, the encoder 2 is in the form of one annular, that is, ring shaped magnetic encoder having a plurality of magnetic pole pairs (each pair consisting of magnetic poles N and S) 2c magnetized as to-be-detected poles to a peripheral surface thereof in a fashion arranged at respective positions at equidistantly spaced from each other in a direction circumferentially thereof, and is made rotatable when fitted to a rotating body of an object to be detected (not shown) so as to assume a coaxial relation therewith. In this case, the sensor 3 is rendered to be a magnetic sensor capable of detecting the magnetic poles N and S of the magnetic encoder 2 and is disposed on, for example, an outer diametric side so as to be held in fact-to-face relation with the peripheral surface of the magnetic encoder 2.

Figure 3A:
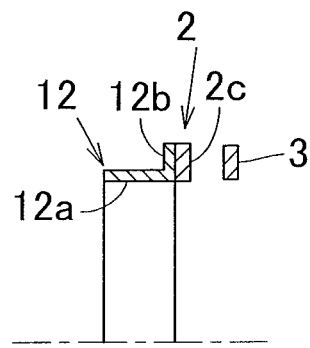
FIG. 3A is a fragmentary sectional view showing another example of the structure of the encoder employed in the rotation detecting device.
Figure 3B:
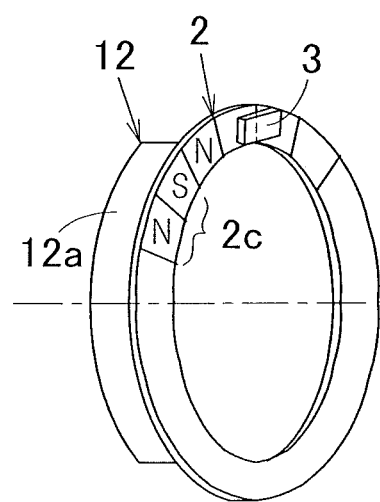
FIG. 3B is a perspective view of the encoder shown in FIG. 3A.

Although in the structural example of the magnetic encoder 2 shown in FIGS. 2A and 2B, the magnetic encoder is of a radial type in which the magnetic pole pairs 2c are magnetized to the peripheral surface, the magnetic encoder 2 may be of an axial type as shown in FIGS. 3A and 3B in a fragmentary sectional view and a perspective view, respectively. In the structural example shown in FIGS. 3A and 3B, the plurality of the magnetic pole pairs 2c are magnetized so as to be spaced equidistantly from each other in a circumferential direction of a side face of an upright wall 12b, which extends from one end of a cylindrical wall 12a of a ring shaped core metal 12 that has a section of, for example, an L-shaped configuration, and is fitted to a rotating body such as, for example, the rotary shaft, with the cylindrical wall 12a of the core metal 12 then mounted on an outer peripheral surface of the rotating body. In this case, the magnetic sensor 3 is so arranged as to be oriented in an axial direction so that it may confront a magnetized surface of the magnetic encoder 2.

Figure 4A:
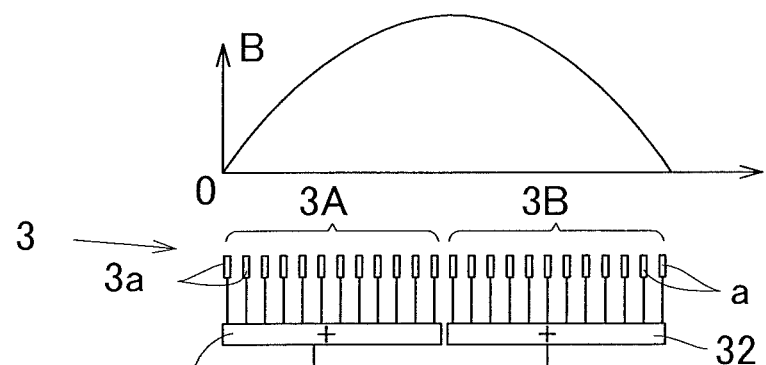
FIG. 4A is an explanatory diagram showing one example of a sensor employed in the rotation detecting device.
Figure 4B:
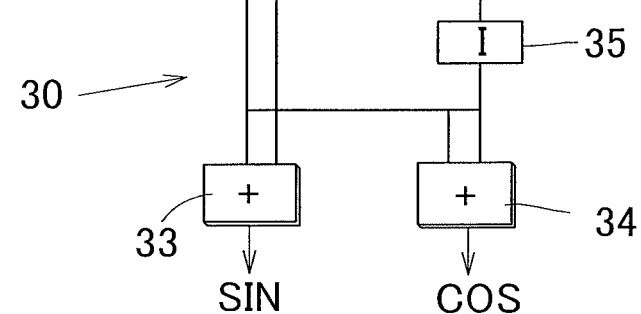
FIG. 4B is an explanatory diagram showing one example of a sensor employed in the rotation detecting device.
Figure 4C:
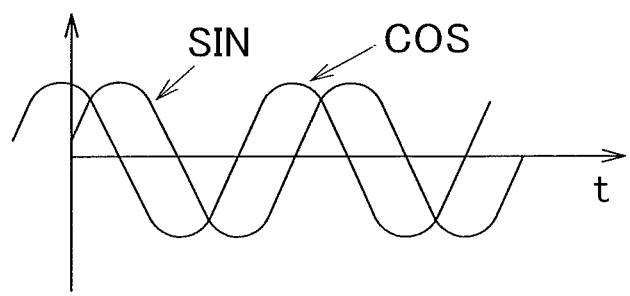
FIG. 4C is an explanatory diagram showing one example of a sensor employed in the rotation detecting device.

The magnetic sensor 3 in this embodiment is made up of line sensors 3A and 3B, such as shown in FIG. 4B, and a calculating and amplifying section 30. The line sensors 3A and 3B are comprised of a plurality of magnetic sensor elements 3a arranged equidistantly in a direction of arrangement of the magnetic poles in the magnetic encoder 2. The calculating and amplifying section 30 is comprised of a plurality of adding circuits 31, 32, 33 and 34 and an inverter 35. It is to be noted that FIG. 4A illustrates the interval of one magnetic pole of the magnetic encoder 2 in the form as converted into the magnetic field strength. In this case, the first line sensor 3A is so arranged as to correspond to a phase interval of 90° of the 180° phase interval shown in FIG. 4A whereas the second line sensor 3B is so arranged as to correspond to the remaining 90° phase interval. By so arranging, when a signal S1, in which detection signals of the first line sensor 3A are added by the adding circuit 31, and a signal S2, in which a detection signals of the second line sensor 3B are added by the adding circuit 32, are added together by an other adding circuit 33, a sin signal corresponding to such a magnetic field signal as shown in FIG. 4C is obtained. Also, when the signal S1 and the signal S2 having passed through the inverter 35 are added together by a further adding circuit 34, a cos signal corresponding to such a magnetic field signal as shown in FIG. 4C is obtained. From the two phase output signals so obtained, it is possible to detect the position within the magnetic poles.

Where the magnetic sensor 3 is constructed in the form of the line sensors as discussed above, influences which would be brought about by strains of the magnetic field pattern and/or noises can be lessened and, therefore, the phase of the magnetic encoder 2 can be highly accurately detected.

It is to be noted that as another example of the magnetic sensor 3, the use may be made of two magnetic sensor elements such as, for example, Hall elements, which are arranged spaced from each other in a direction of arrangement of the magnetic poles so that, assuming that a pitch λ, of one magnetic pair of the magnetic encoder 2 is defined as one cycle, a 90° phase difference (λ/4) may establish and, calculation may be made by multiplying the phase within the magnetic pole [$\phi=\tan^{-1}(\sin\phi/\cos\phi)$] from two phase signals (sin φ and cos φ) that can be obtained by those two magnetic sensor elements.

The multiplying unit 4 in such case includes, as shown in FIG. 5, a signal generating section 41, a sector shape detecting section 42, a multiplexer section 43 and a minimal interpolation section 44. The signal generating section 41 generates, from the two phase signals sin and cos outputted from the magnetic sensor 3 referred to above, a plurality of, for example, $2^{m-1}$, signals si, which have the same amplitudes A0 and the same average values C0 and which are successively displaced in phase by a quantity of $2\pi/2^{m-1}$ from each other, in which m represents a positive integer less than n and i represents a positive integer of any one of 1 to $2^{m-1}$.

The sector shape detecting section 42 detects a plurality of, for example, $2^m$, sector shapes Pi divided by the $2^{m-1}$ of signals si, which generate a plurality of, for example, m, digital signals bn−m+1, bn−m+2, ..., bn−1 and bn that are coded so as to define the $2^m$ of equal sector shapes Pi.

The multiplexer section 43 is an analog circuit which is controlled by the digital signals bn−m+1, bn−m+2, ..., bn−1 and bn generated from the sector shape detecting block 42 referred to previously, and processes the $2^{m-1}$ of signals si generated from the signal generating section 41 so as to generate a first signal A, of which amplitude lies in a portion between the average value C0 of the series of $2^{m-1}$ signals si and a first threshold value L1, and a second signal B, of which amplitude lies in a portion between the first threshold value L1 of the series of the $2^{m-1}$ signals si and a second threshold value L2 that is higher than the first threshold value L1.

The minimal interpolation section 44 minimally interpolates the first and second signals A and B, both generated from the multiplexer section 43, in each of the $2^m$ of sector shapes Pi, in order to generate the (n−m) of digital signals $b_1$, $b_2$, ..., $b_{n-m-1}$ and $b_{n-m}$, which are so coded that, in order to secure a desired resolving power, each of the $2^m$ of sector shapes Pi of the angle $2\pi/2^m$ is divided into the same $2^{n-m}$ of subsector shapes of the angle $2\pi/2^n$. By this multiplying unit 4, the two phase signals sin and cos obtained from the magnetic sensor 11 are multiplied to rotation pulses of the (n−m) of digital signals $b_1$, $b_2$, ..., $b_{n-m-1}$ and $b_{n-m}$ ($b_1$, $b_2$, ..., $b_8$ and $b_9$ in the instance as shown) which are multiplication signals.

Referring to FIG. 1, the pulse outputting unit 5 outputs rotation pulses having at least two different multiplying powers, from the multiplied pulse b which is phase data within the to-be-detected pole (magnetic pole pair) 2c inputted from the multiplying unit 4. In the instance now under discussion, the rotation pulses of the three multiplying powers are simultaneously outputted from respective high resolution rotation pulse output sections 6A and 6B and an ordinary pulse output section 6C. Assuming that the multiplication factor N of the multiplying unit 4 is 20, the rotation pulses of a multiplying power (×20), the multiplication factor thereof remaining as it stands, for example, are outputted from the first high resolution rotation pulse output section 6A. In other words, the position (the phase) of the magnetic encoder 2 within one magnetic pole pair 2c is detected with 20 rotation pulses. Also, from the second high resolution rotation pulse output section 6B, rotation pulses of a predetermined multiplying power (×10), that is, for example, smaller than the multiplication factor N, are outputted by frequency dividing the multiplication pulse b. From the ordinary pulse output section 6C, rotation pulses of, for example, a multiplying power (×1) (one rotation pulse per one magnetic pole pair) are outputted by further frequency dividing the multiplication pulse b. It is to be noted that the pulse outputting unit 5 may be provided with three or more high resolution rotation to pulse output sections.

In the embodiment now under discussion, the multiplying power of the rotation pulses outputted in the pulse outputting unit 5 are fixed to 20, 10 and 1 as described above, but as shown by the phantom line in FIG. 1, a multiplying power changing unit 7 may be provided outside so that the multiplying power of the rotation pulses outputted can be changed in response to a command from this multiplying power changing unit 7.

The magnetic sensor 3, the multiplying unit 4 and the pulse outputting unit 5 are integrated together on a common integrated circuit 8, which is provided with plurality of output terminals, from which respective rotation pulses of varying multiplying powers in the pulse outputting unit 5 are outputted. The integrated circuit 8 is comprised of an IC chip. Accordingly, mounting of the rotation detecting device 1 onto the wheel support bearing assembly or the like can be performed compactly and a reduction in weight can also be accomplished.

Of the rotation pulses of the different multiplying powers outputted from the pulse outputting unit 5, the rotation pulse of the smallest multiplying power, that is, the rotation pulse of the multiplying power of 1 (×1) in the embodiment now under discussion is converted into an electric current output by a voltage to electric current converting circuit 9 that is provided in the subsequent stage. More specifically, as the electric current output, a pulse signal of 7 mA in current value and a pulse signal of 14 mA in current value are outputted alternately. Accordingly, it is possible to accommodate an input signal mode of a process control device for processing the output signal of the rotation detecting device 1.

The voltage to electric current converting circuit 9 referred to above is surface mounted on a printed substrate (not shown) together with the integrated circuit 8 and is covered in its entirety with a molding material. The molding material is, for example, a resin. Accordingly, it is possible to secure a waterproofing and an impact resistance of the rotation detecting device 1.

According to the rotation detecting device 1 of the construction described hereinabove, the multiplication pulse b of a high multiplying power, in which the phase within the to-be-detected pole 2c of the encoder 2 has been multiplied, is generated from the multiplying unit 4 and, based on the multiplication pulse b, arrangement has been made in the pulse outputting unit 5 so that the rotation pulses of two or more multiplying powers that differ from each other can be outputted. For this reason, regardless of whether the process control device for processing the output signal of the rotation detecting device 1 is a standard one or whether it is a new one having a high input signal resolving power, correspondence can be enabled by selecting the rotation pulse of a corresponding resolving power (multiplying power) from pluralities of types of the rotation pulses, and, accordingly, the rotation detection can be accomplished accurately.

Also, by selecting the detecting resolving power in dependence on the rotational speed of the rotating body of the object to be detected, the detected rotation signal can be processed even with the process control device of the standard input signal resolving power. In other words, where the rotation detecting device 1 is used as mounted on, for example, a wheel support bearing assembly so that the rotation of the vehicle wheel can be detected thereby, and if the signal processing capability of the vehicle mounted ABS control device, which is a process control device, is standard, it may occur that, when the rotation pulse of the high resolving power is inputted during a high speed travel of the automotive vehicle, the ABS control device will be unable to process the input signal or the processing will be delayed. In such case, if a method of use, in which input is made by selecting and inputting the rotation pulse of a small multiplying power during the high speed travel, but selecting and inputting the rotation pulse of a high multiplying power during a low speed travel, is adopted, the signal processing can be accomplished sufficiently even with the standard ABS control device.

By way of example, where for the high resolving power rotation pulse output sections 6A and 6B of the pulse outputting unit 5, three types capable of outputting rotation pulses of respective magnifying powers of 40, 20 and 2 are prepared and are made readily available, as one example of the method of use referred to above, a method, in which the rotation pulse of the magnifying power of 40 is selected in the case of the speed range up to 40 km per hour, and the rotation pulse of the magnifying power of 2 is selected in the case of the speed range higher than it, may be employed to select the rotation pulse of each magnifying power in dependence on the speed. Also, as another example, a method, in which the rotation pulse of the magnifying power of 40 is selected in the case of the speed range up to 40 km per hour, the rotation pulse of the magnifying power of 20 is selected in the case of the speed range within the range of 40 to 80 km per hour, and the rotation pulse of the magnifying power of 2 is selected in the case of the speed range higher than that, may be employed to select the rotation pulse of each magnifying power in dependence on the speed.

Also, since in the embodiment hereinbefore described, only one encoder 2 is employed and the detection output of the sensor 3 for detecting the to-be-detected poles 2c of the encoder 2 is inputted to the multiplying unit 4, there is no need to employ two types of sensors in simultaneously outputting the rotation pulse of the high resolving power (high multiplying power) and the rotation pulse of the low resolving power (low multiplying power), and, therefore, undesirable increases of the space and the weight can be advantageously suppressed.

Figure 6:
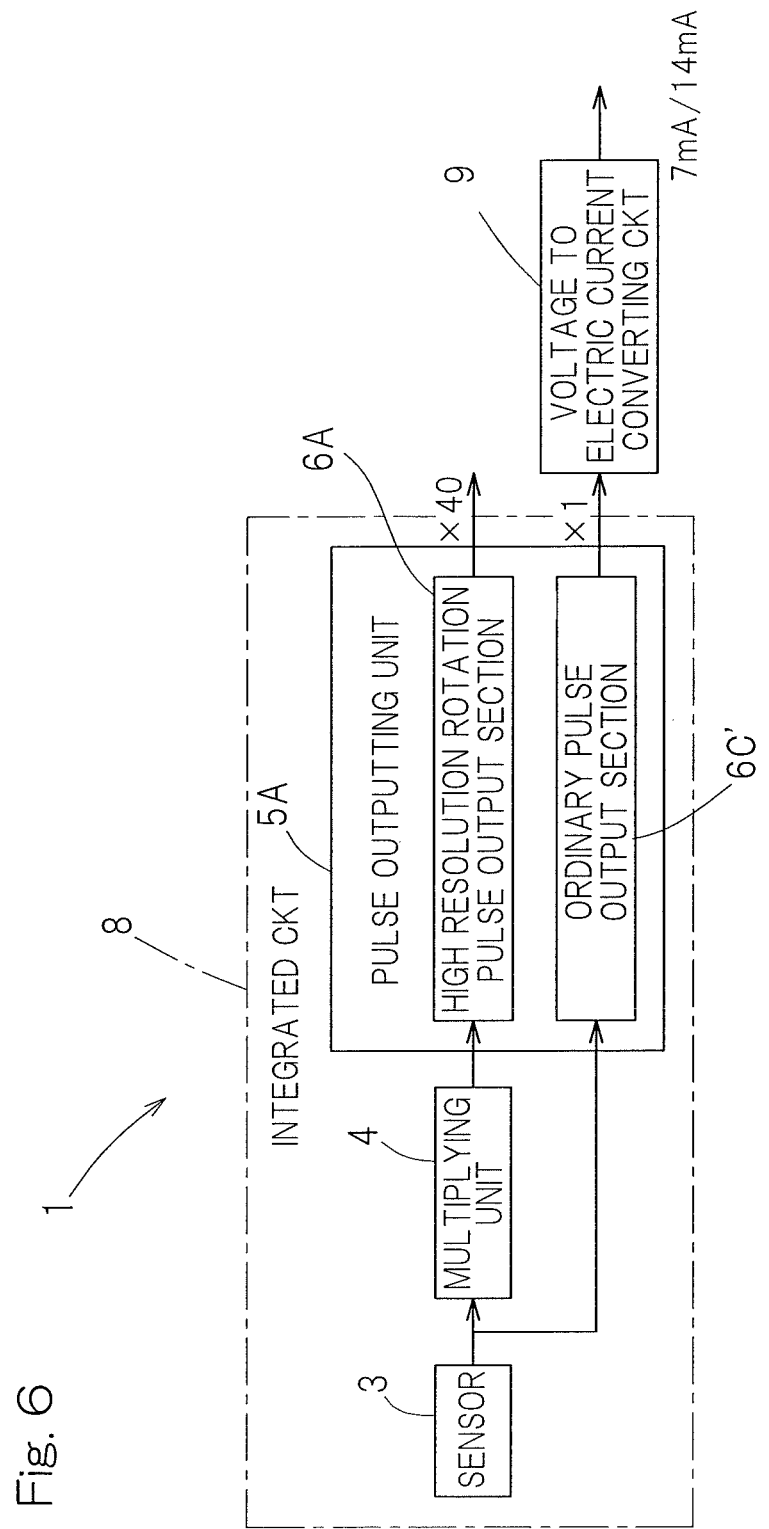
FIG. 6 is a block diagram showing a schematic structure of the rotation detecting device according to a second embodiment of the present invention.

FIG. 6 illustrates the rotation detecting device according to a second preferred embodiment. In this rotation detecting device 1 shown in FIG. 6, the rotation pulse output section in the pulse outputting unit 5A is designed to have a high resolution rotation pulse output section 6A for outputting the rotation pulse of a high resolving power (a high magnifying power) from an output of the multiplying unit 4, and an ordinary pulse output section 6C' for outputting a pulse obtained from a detection output of the sensor 3 without passing through the multiplying unit 4. The rotation pulse of a multiplying power of, for example, 40 (×40) is outputted from the high resolution rotation pulse output section 6A. The pulse obtained from the detection output of the sensor 3 referred to above is a pulse for outputting one pulse in correspondence with one to-be-detected pole of the encoder 2. As the high resolution rotation pulse output section 6A, other section that outputs the rotation pulse of any other type of the multiplying power may be separately included. Other structural features are similar to those shown in and described with reference to FIG. 1 in connection with the first embodiment of the present invention.

Figure 7:
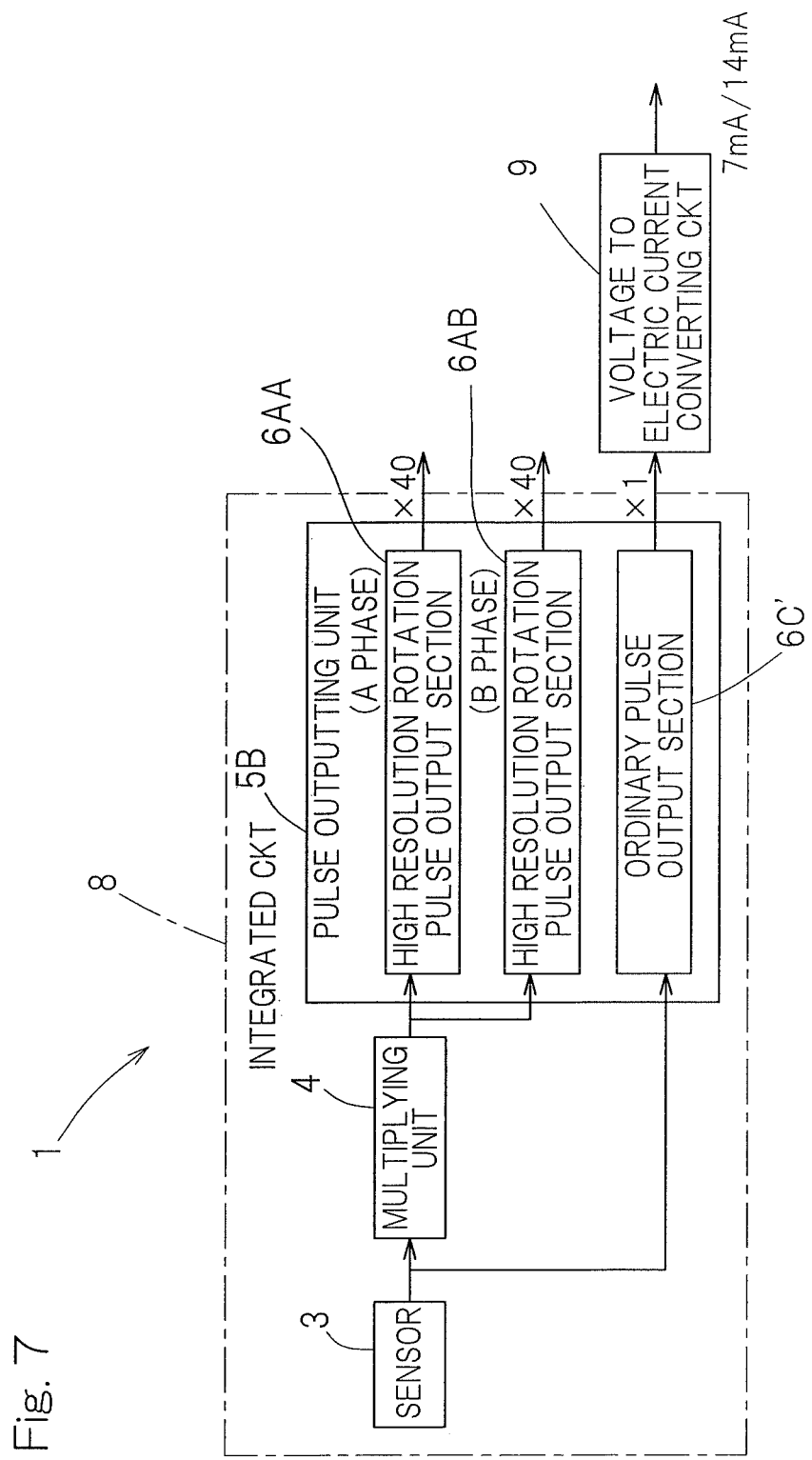
FIG. 7 is a block diagram showing a schematic structure of the rotation detecting device according to a third embodiment of the present invention.

FIG. 7 illustrates the rotation detecting device according to a third preferred embodiment. In this rotation detecting device 1 designed in accordance with the third embodiment, in the second embodiment shown in and described with particular reference to FIG. 6 the high resolution rotation pulse output section capable of outputting the rotation pulse of at least one type of the magnifying power, which is employed in the pulse outputting unit 5A, is designed to have a pair of high resolution rotation pulse output sections 6AA and 6AB capable of individually outputting an A phase rotation pulse and a B phase rotation pulse, which are 90° displaced in phase relative to each other. Other structural features are similar to those shown in and described with reference to FIG. 6 in connection with the second embodiment of the present invention.

As described above, by outputting phase difference signals of the A and B phases that are displaced 90° relative to each other as the rotation pulse signals of the same multiplying powers, the detection of the rotational direction becomes possible. When this rotation detecting device 1 is mounted on the wheel support bearing assembly for the automotive vehicle, forward and backward movements can be detected.

Figure 8:
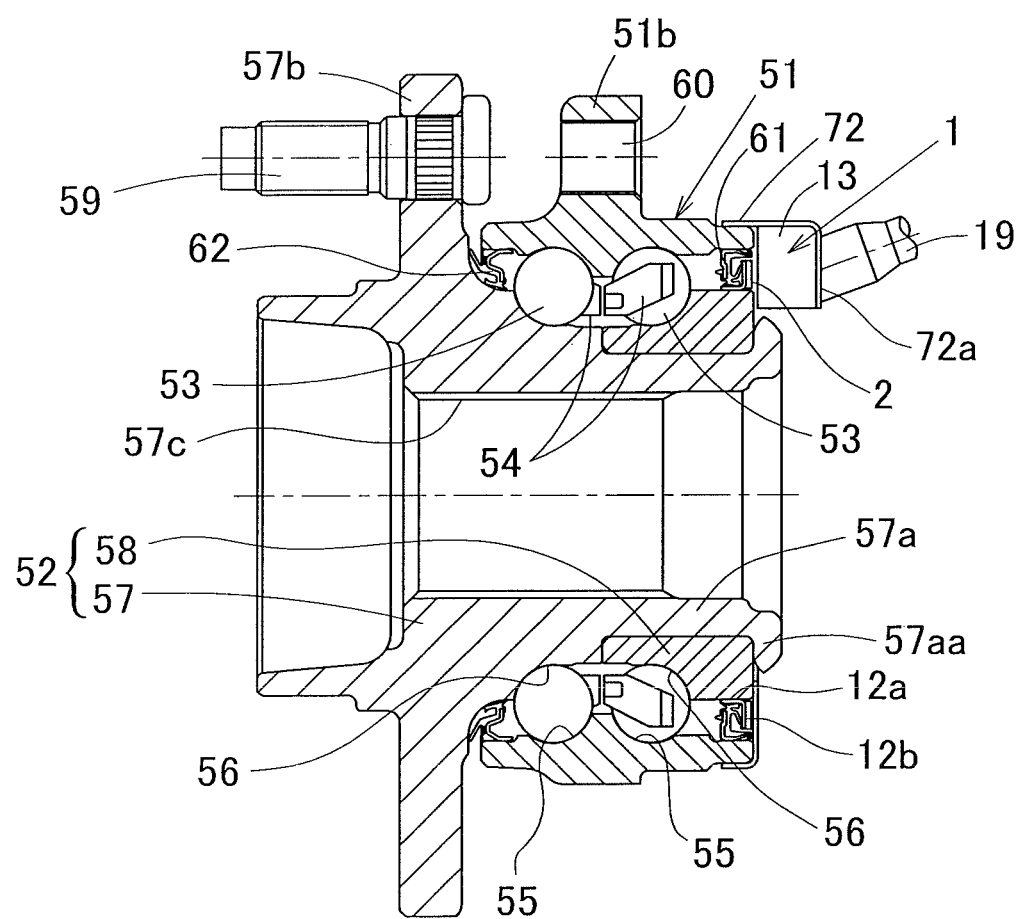
FIG. 8 is a sectional view showing one example of a structure of a rotation detecting device equipped wheel support bearing assembly equipped with the rotation detecting device of any one of the foregoing preferred embodiments of the present invention.

One example of the wheel support bearing assembly having the rotation detecting device 1 according to any one of the previously described embodiments mounted thereon is shown in FIG. 8 in a sectional representation. This wheel support bearing assembly is adapted to be fitted to the vehicle such as, for example, an automotive vehicle and, in this specification, the terms "outboard" and "inboard" represent one side of the vehicle body away from the longitudinal center of the vehicle body and the other side of the vehicle body close to the longitudinal center of the vehicle body, respectively, when assembled in the vehicle body.

This wheel support bearing assembly is for rotatably supporting a vehicle wheel relative to a vehicle body with a plurality of rows of rolling elements 53 interposed between an outer member 51 and an inner member 52 and has the rotation detecting device 1 of the type described hereinbefore mounted thereon. The encoder 2 and a sensor segment, both employed in the rotation detecting device 1, have their external shapes so selected as to suit to respective manners of fitting them for each row.

The outer member 51 is a stationary member and the inner member 52 is a rotating member. The rolling elements 53 of each row are retained by a retainer 54 for each row and are interposed between a plurality of rolling surfaces 55 defined in an inner periphery of the outer member 51, and a plurality of rolling surfaces 56 defined in an outer periphery of the inner member 52. Those wheel support bearing assembly is a double row angular contact ball bearing type, in which the respective rows of the rolling surfaces 55, 55 and 56, 56 are so formed as to have their contact angles in a back-to-back relation to each other.

The example shown in FIG. 8 is a so-called third generation type and is used for the support of a vehicle drive wheel. The inner member 52 is made up of two components, that is, a hub axle 57 and an inner ring 58 mounted on a portion of the outer periphery of an inboard side of an axle portion 57a of the hub axle 57, and the respective rolling surfaces 56 are defined on the axle portion 57a of the hub axle 57 and the outer periphery of the inner ring 58. The axle portion 57a of the hub axle 57 has a center bore 57c defined therein for receiving a stem portion (not shown) of a constant velocity joint. The inner ring 58 is mounted on a stepped portion formed in the axle portion 57a of the hub axle 57 and fixed to the hub axle 57 by means of a crimped portion 57aa provided at an inboard end of the axle portion 57a. The hub axle 57 has a wheel mounting flange 57b formed in a portion of the outer periphery thereof adjacent an outboard end thereof, and the vehicle wheel and a brake rotor (both not shown) are fitted to the wheel mounting flange 57b in an overlapped relation to each other by means of a plurality of hub bolts 59. Those hub bolts 59 are press-fitted into corresponding bolt mounting holes provided in the wheel mounting flange 57b. The outer member 51 has its entirety made up of a unitary member including a vehicle body fitting flange 51b formed in the outer periphery thereof. The outer member 51 is fitted to a knuckle (not shown) of an automobile suspension system by means of knuckle bolts inserted through bolt insertion holes 60 in the vehicle body fitting flange 51b.

Opposite ends of a bearing space delimited between the outer member 51 and the inner member 52 are sealed by respective sealing devices 61 and 62 each made up of a contact seal.

The sensor segment (segment where the sensor 3 is embedded) 13 of the rotation detecting device 1 is fitted to the inboard end of the outer member 51 through a sensor mounting member 72. The sensor mounting member 72 is in the form of a ring shaped metal plate that is mounted on an outer peripheral surface of the outer member 51 in contact with an end face thereof and has a circumferential portion provided with a sensor mounting piece 72a for fitting the rotation detecting device 1. The magnetic encoder 2 of the rotation detecting device 1 is of the axial type as shown in and described with particular reference to FIGS. 3A and 3B, which includes the core metal 12 having a L-shaped cross section and a multi-polar magnet provided on the upright wall 12b of the core metal 12, and is mounted on an outer periphery of the inner ring 58. The magnetic encoder 2 concurrently serves as a portion of the inboard side part of the sealing device 61. The magnetic encoder 2 and the sensor 3 are opposed to each other in the axial direction. A cable 19 is drawn outwardly from the sensor segment 13.

According to the rotation detecting device equipped wheel support bearing assembly of the construction described above, correspondence can be made regardless of whether the ABS control device of ECU on the side of the automotive body for processing the output signal of the rotation detecting device 1 or whether it is a novel one having a high input signal resolving power and, hence, the rotation of the vehicle wheel can be detected. Also, where the signal processing capability of the ABS control device is standard, although it may occur that the input signal cannot be processed in the ABS control device, or the processing will be retarded, when the high resolution rotation pulse is inputted during a high speed travel, the use of the method of use of selecting and inputting the rotation pulse of a low multiplying power during the high speed travel, but selecting and inputting the rotation pulse of a high multiplying power during a low speed traveling is effective to sufficiently achieve the signal processing even with the standard ABS control device.

Figure 9:
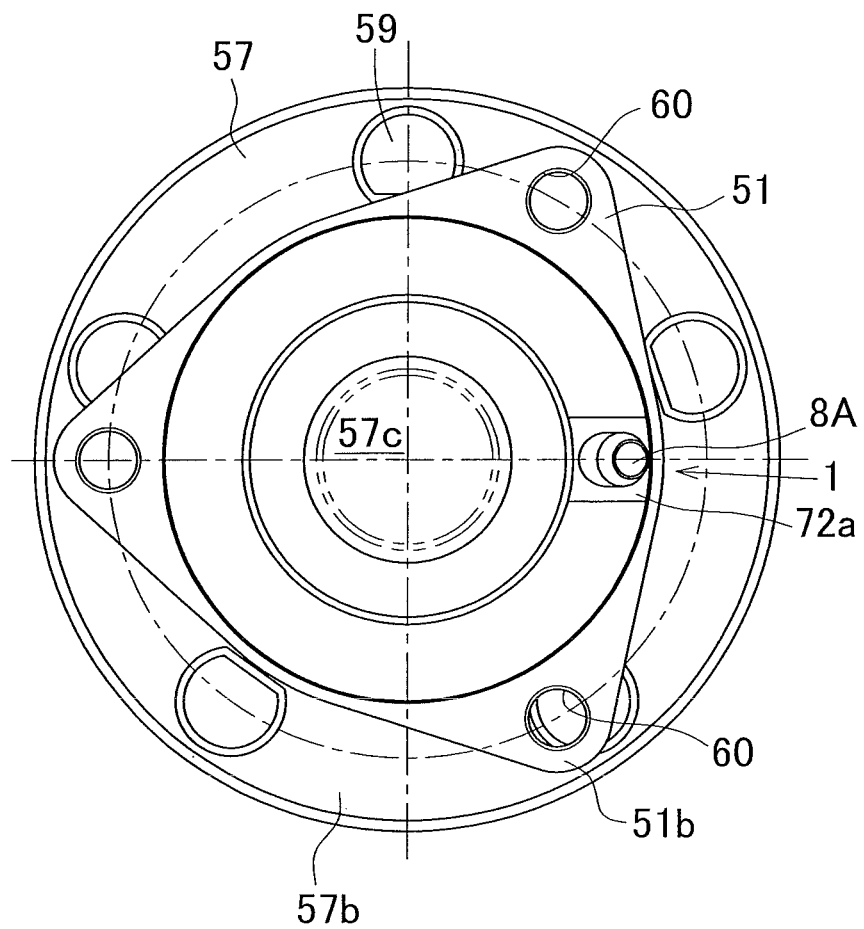
FIG. 9 is a side view showing the rotation detecting device equipped wheel support bearing assembly as viewed from an inboard side.
Figure 10:
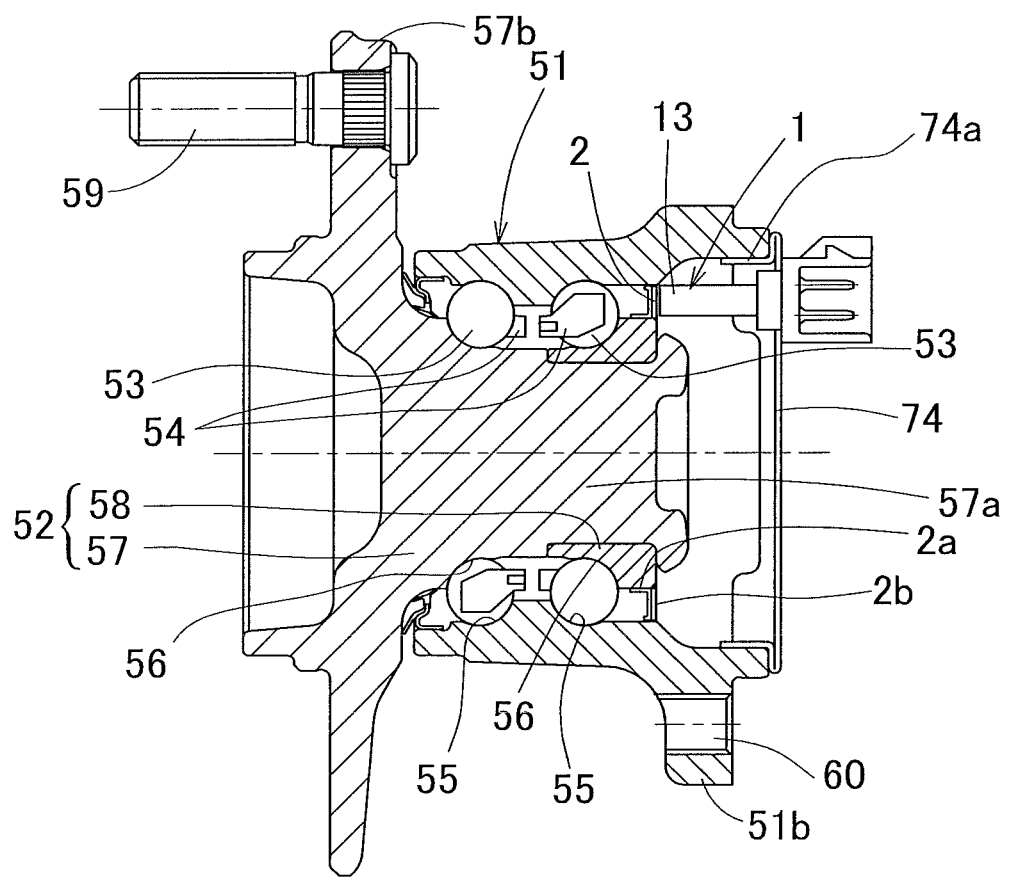
FIG. 10 is a sectional view showing another example of the structure of the rotation detecting device equipped wheel support bearing assembly.
Figure 11:
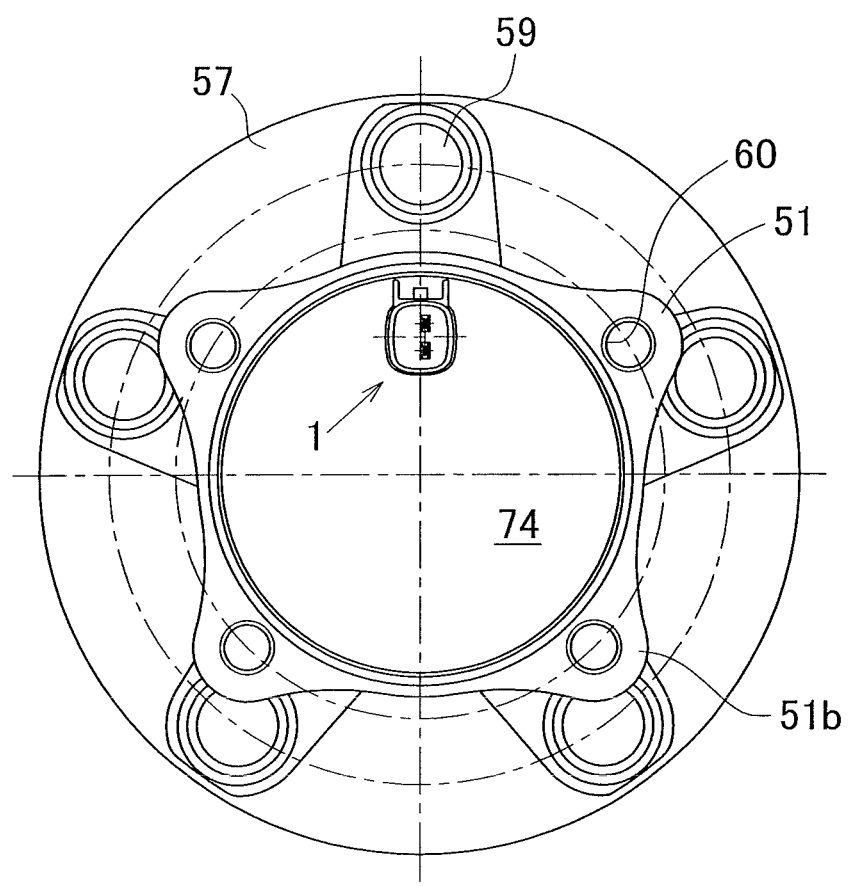
FIG. 11 is a side view showing the rotation detecting device equipped wheel support bearing assembly as viewed from the inboard side.

FIGS. 10 and 11 show an example generally similar to the example shown in and described with particular reference to FIGS. 8 and 9, but different therefrom in that the wheel support bearing assembly is used for rotatably supporting a vehicle driven wheel, in which the hub axle 57 is solid with no center bore defined therein. The inboard end of the outer member 51 extends axially beyond the inner member 52 with its end face opening covered by a cap 74. The cap 74 has a collar 74a formed in an outer peripheral edge thereof and is fitted with the collar 74a mounted on the inner periphery of the outer member 51. To this cap 74 the sensor segment 13 is fitted so as to confront the magnetic encoder 2. The cap 74 is detachably provided with a main body of the rotation detecting device by means of bolts and nuts (not shown), while at least the sensor segment 13 of the rotation detecting device 1 is inserted in the cap 74. In the condition with the sensor segment 13 inserted in the cap 74, the structure is such that an annular gap of the cap 74 delimited between it and the main body of the rotation detecting device is tightly sealed by an elasticity of a molding material (an elastic member) for covering the sensor segment 13. The magnetic encoder 2 is mounted on the outer periphery of the inner ring 58 so as to confront the rotation detecting device 1 in the axial direction.

In the case of this construction, although application is limited to the use for supporting the vehicle driven wheel, since the end opening in its entirety is covered by the cap 74, an undesirable ingress of muddy water from the outside into a site of installation of the rotation detecting device 1 can be prevented and, hence, the reliability of the rotation detecting device 1 can be increased.

Figure 12:
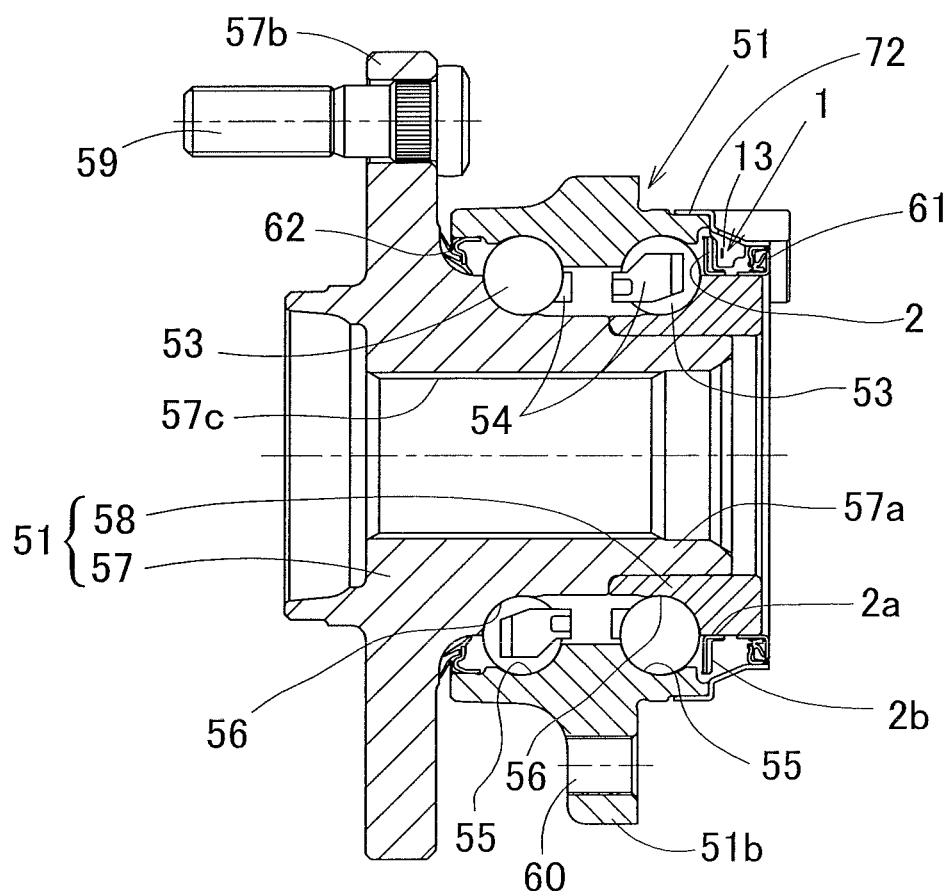
FIG. 12 is a sectional view showing a further example of the structure of the rotation detecting device equipped wheel support bearing assembly.
Figure 13:
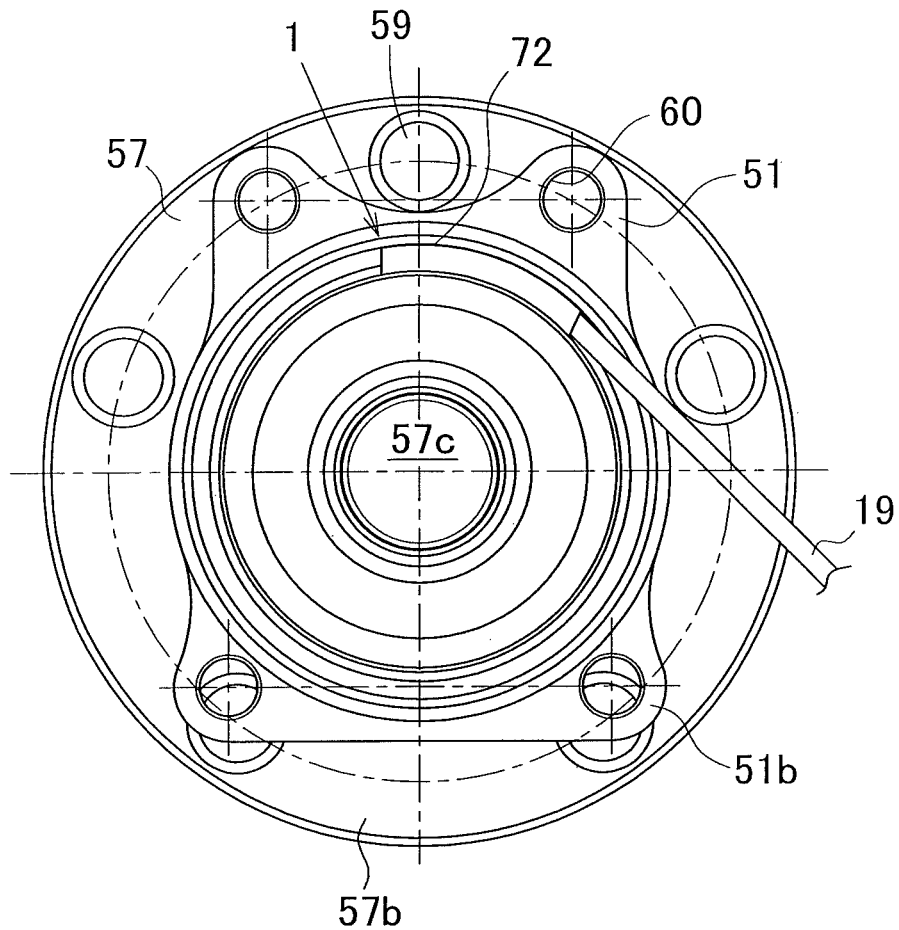
FIG. 13 is a side view showing the rotation detecting device equipped wheel support bearing assembly as viewed from the inboard side.

FIGS. 12 and 13 show an example similar to the example shown in and described with particular reference to FIGS. 8 and 9, but different therefrom in that the inboard sealing device 61 for the bearing space on the inboard side is disposed outside of the magnetic encoder 2. In other words, the sealing device 61 in the form of, for example, a contact seal is provided between the annular sensor mounting member 72, fitted to the outer member 51, and an inner ring 58.

In the case of the construction shown in FIGS. 12 and 13, by the sealing device 61, the magnetic encoder 2 is sealed from an exterior space and is therefore prevented from foreign matters that may be caught in between the magnetic encoder 2 and the sensor segment 13. Other structural features, and effects brought thereby, are similar to those afforded by the embodiment shown in and described with particular reference to FIGS. 8 and 9.

Figure 14:
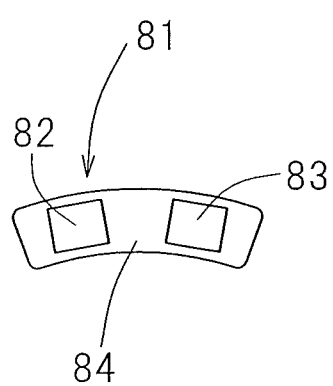
FIG. 14 is a front elevational view showing a relationship between an arcuate substrate and an integrated circuit having a multiplying unit in the rotation detecting device according to another preferred embodiment of the present invention.

FIG. 14 illustrates one example of a sensor and processing circuit mounted component 81. This sensor and processing circuit mounted component 81 is of a structure in which a sensor element unitary component 81 for the detection of the rotation and an integrated circuit 83 for the multiplication processing of an output of a high multiplying power are arranged and mounted on an arcuate substrate 84, which is a printed circuit substrate, in a direction circumferentially thereof. The arcuate substrate 84 is arranged so as to confront axially the magnetic encoder 2 of the axial type and has an arcuate shape extending in the form of a strip in the circumferential direction in a fashion coaxial with a center of the magnetic encoder 2.

The sensor element unitary component 82 is comprised of, for example, the sensor 3 shown in FIG. 1 and is in the form of an integrated circuit, in which the line sensors 3A and 3B and the calculating and amplifying section 30 are rendered to be an IC chip. It is, however, to be noted that the calculating and amplifying section 30 may be provided in the multiplication processing integrated circuit 83 instead of being provided in the sensor element unitary component 82. The multiplication processing integrated circuit 83 is of a type in which, for example, the multiplying unit 4 and the pulse outputting unit 5, both best shown in FIG. 1, are rendered to be an IC chip. The multiplication processing integrated circuit 83 may be an IC chip, in which the multiplying unit 4 and the pulse outputting unit 5A, both best shown in FIG. 6, are integrated together, or an IC chip in which the multiplying unit 4 and the pulse outputting unit 5B, both best shown in FIG. 7, are integrated together. Where the calculating and amplifying section 30 is not provided in the sensor element unitary component 82, the calculating and amplifying section 30 is provided in the multiplication processing integrated circuit 83. Respective functions of the sensor 3, the multiplying unit 4 and the pulse outputting unit 5, 5A, 5B forming respective parts of the sensor element unitary component 82 are such as hereinbefore described.

According to the sensor and processing circuit mounted component 81 of the structure hereinabove described, since the sensor element unitary component 82 and the multiplication processing integrated circuit 83 are disposed on the same arcuate substrate 84, the rotation detecting device 1 as a whole can be constructed compact and the various circuits and the sensor 3 can therefore be arranged in a limited available space.

Figure 15:
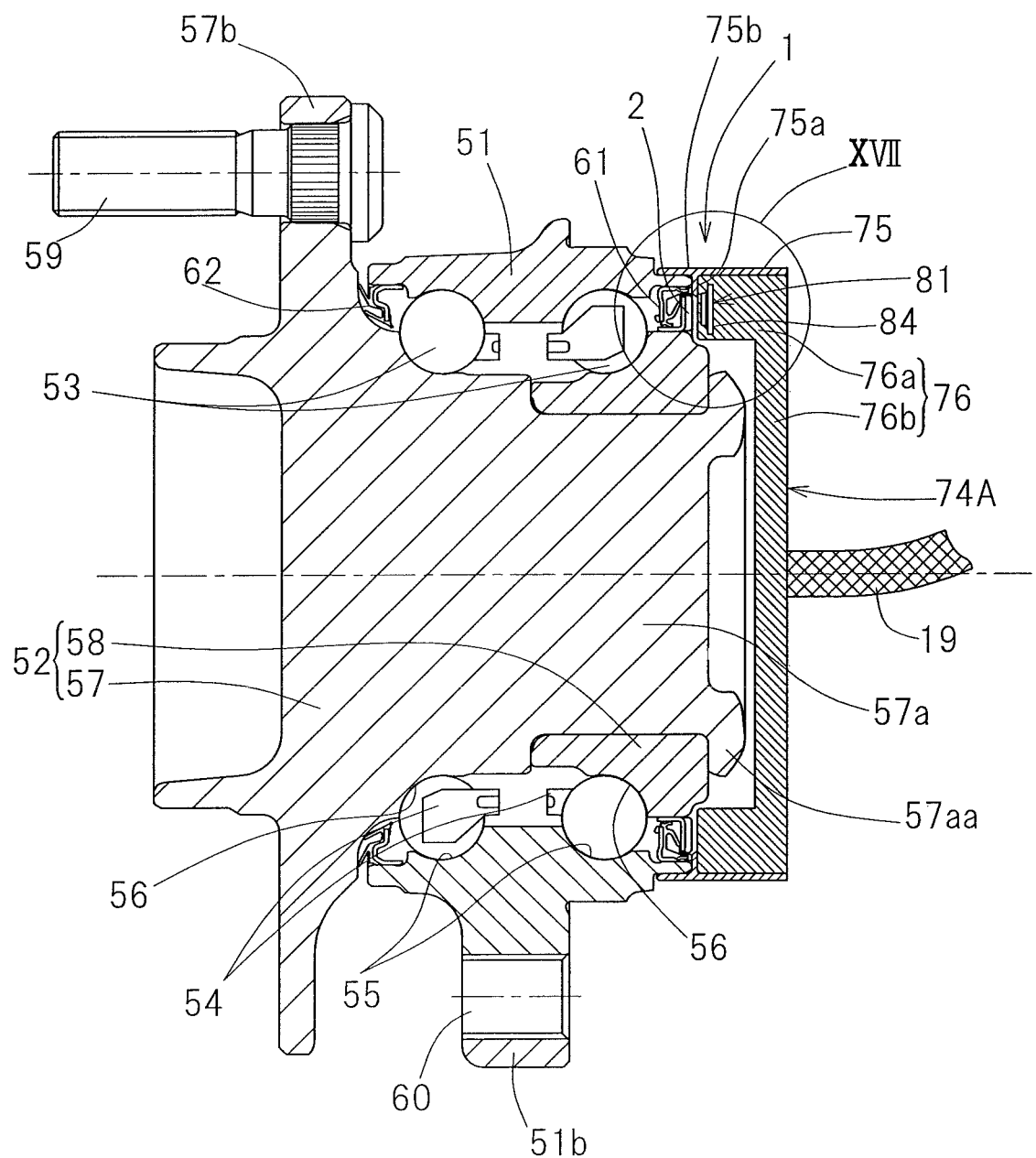
FIG. 15 is a sectional view showing one example of the structure of the rotation detecting device equipped wheel support bearing equipped with the rotation detecting device having the arcuate substrate shown in FIG. 14.
Figure 16:
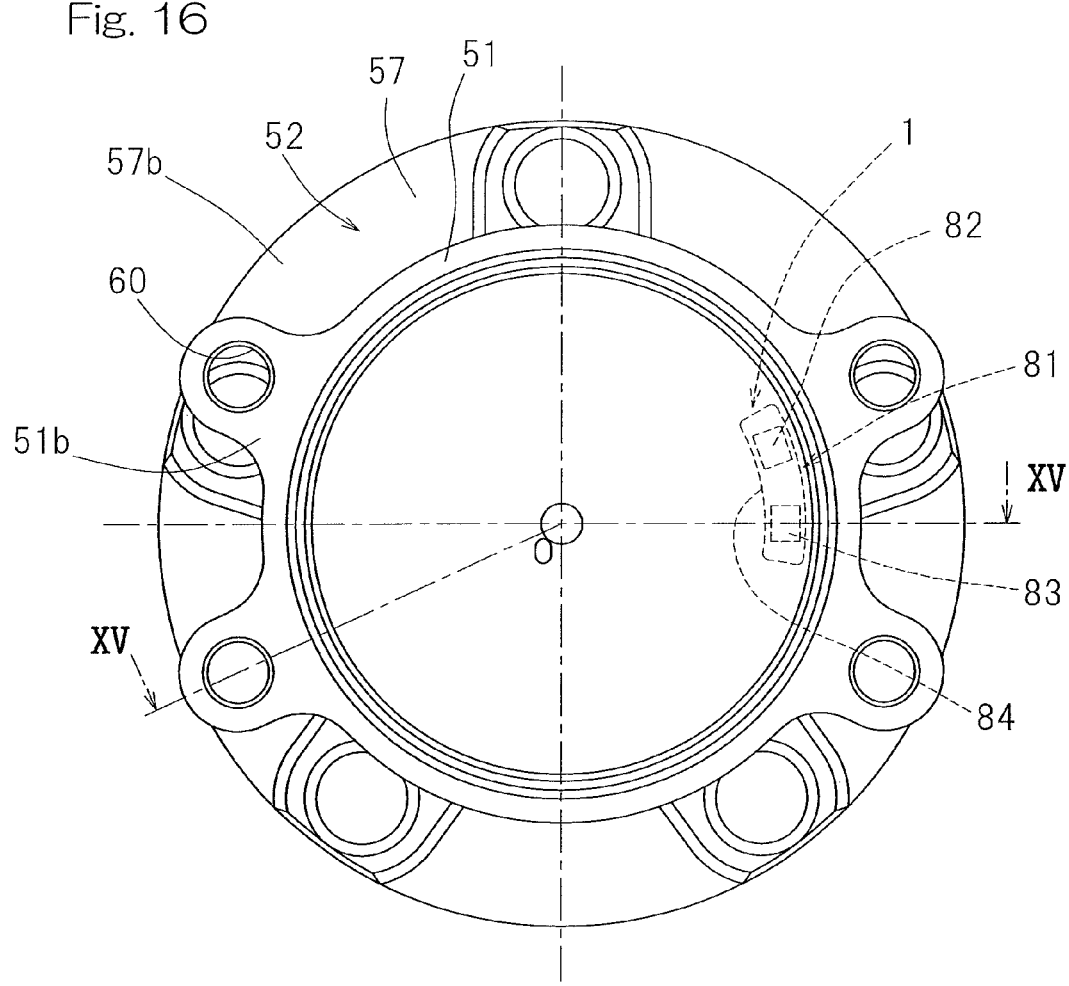
FIG. 16 is a side view showing the rotation detecting device equipped wheel support bearing assembly as viewed from the inboard side.
Figure 17:
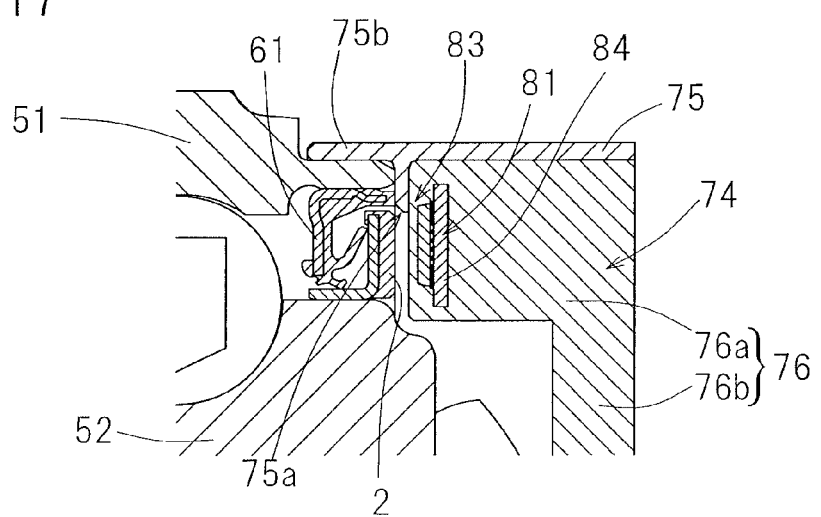
FIG. 17 is an enlarged sectional view of a portion enclosed by the circle XVII in FIG. 15.

FIGS. 15 to 17 illustrate one example of the wheel support bearing assembly equipped with the sensor and processing circuit mounted component 81 shown in and described with particular reference to FIG. 14. In particular, FIG. 15 is a cross sectional view taken along the line XV-XV in FIG. 16. The illustrated wheel support bearing assembly is for rotatably supporting the vehicle driven wheel, and features other than the hub axle 57 having no center bore and being therefor solid and the sensor mounting structure are similar to those found in the previously described wheel support bearing assembly shown in FIG. 8. For this reason, structures common thereto are designated by like reference numerals and, therefore, while the details thereof are not reiterated, only differences will be described.

As best shown in FIG. 15, the end face opening of the outer member 51 on the inboard side is covered by a cap 74A. The cap 74A is made up of a cylindrical core metal 75 made of a steel material and a resinous member 76 provided on an inner periphery of the core metal 75. The core metal 75 has a flange-like positioning upright wall member 75a protruding radially inwardly thereof and, through a mounting portion 75b in the form of a cylindrical portion protruding towards the outboard side beyond the positioning upright wall member 75a, the core metal 75 is press fitted onto an end outer periphery of the outer member 51 and then fitted thereto. The positioning upright wall member 75a is held in abutment with an end face of the outer member 51. This positioning upright wall member 75a has an inner diameter substantially equal to that of an outer periphery of the encoder 2 fitted to the inner member 52. The resinous member 76 is made up of an annular molding material portion 76a extending along the inner periphery of the core metal 75, and a plate lid portion 76b continued radially inwardly from an inboard end of the molding material portion 76a.

As shown in FIG. 17 on an enlarged scale, the molding material portion 76a has an inner diameter slightly smaller than the inner diameter of the encoder 2 and the sensor and processing circuit mounted component 81 best shown in FIG. 14 is embedded in the molding material portion 76a by means of a molding process on the molding material portion 76a. The sensor and processing circuit mounted component 81 is embedded in the molding material portion 76a so that the sensor element unitary component 82 can be positioned at a location at a predetermined phase angle relative to the outer member 51, with the sensor element unitary component 82 held in face to face relation with the encoder 2. The sensor element unitary component 82 has a surface covered with a thin film of a resin used to form the molding material portion 76a. As best shown in FIG. 15, the cable 19 connected with the sensor and processing circuit mounted component 81 is drawn out to the outside through a center portion of the cap 74A. A portion of this cable 19 inwardly of the resinous member 76 is held in a condition with a plurality of core lines (not shown) left bare or with a sheath enclosing the core lines remaining.

The core metal 75 is preferably prepared from, for example, a stainless (SUS 430 or SUS 304) or a press steel plate or the like, which has been treated to have a rust proof. The resinous member 76 is prepared from a resinous material such as, for example, a polyamide containing resin (66 Nylon or PPA (polyamide)), a special ether containing synthetic resin or PPS. These resinous materials may be added with glass fibers.

According to the wheel support bearing assembly of the construction described above, since the sensor and processing circuit mounted component 81 of a structure, in which the sensor element unitary component 82 and the multiplication processing integrated circuit 83 are mounted on the arcuate substrate 84 is employed, the rotation detecting device 1 as a whole can be constructed compact and the various circuits and the sensor 3 can be arranged in a limited available space. Since the sensor and processing circuit mounted component 81 is embedded in the molding material portion 76a, the water proof and the impact resistance can be secured. Since a press fitted portion of the cap 74A forms a portion of the core metal 75 having a high rigidity, it is excellent in proof strength against separation.

Figure 18:
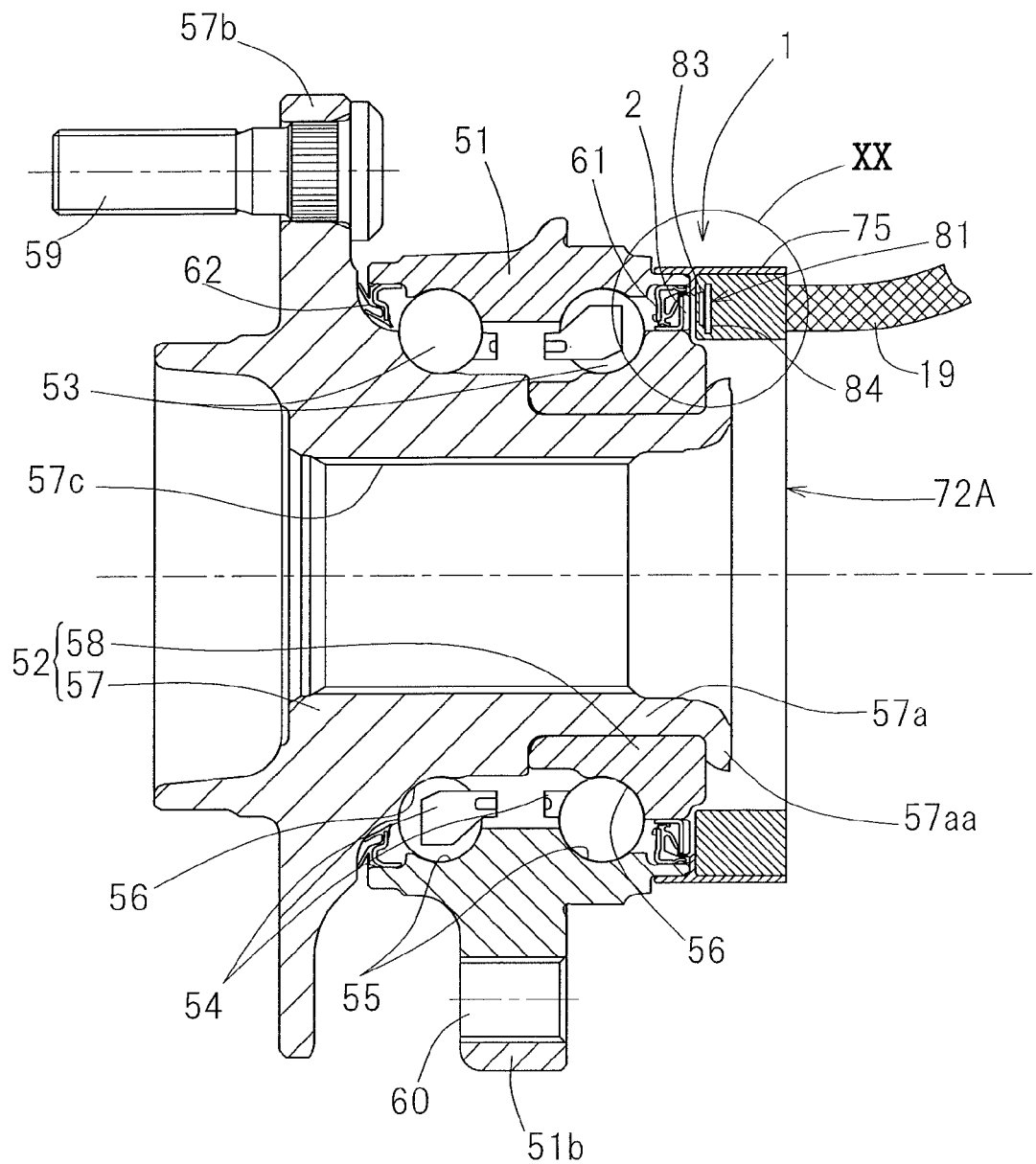
FIG. 18 is a sectional view showing a still further example of the structure of the rotation detecting device equipped wheel support bearing assembly equipped with the rotation detecting device having the arcuate substrate shown in FIG. 14.
Figure 19:
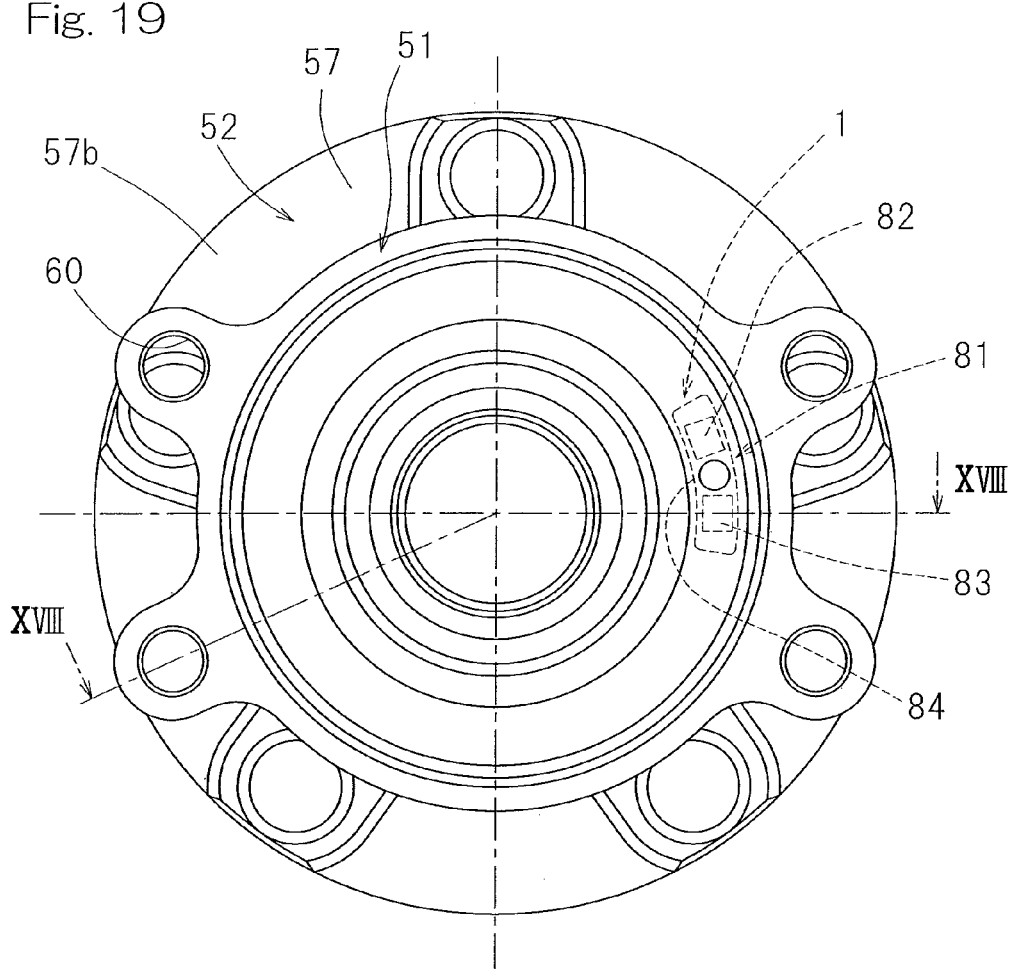
FIG. 19 is a side view showing the rotation detecting device equipped wheel support bearing assembly as viewed from the inboard side.
Figure 20:
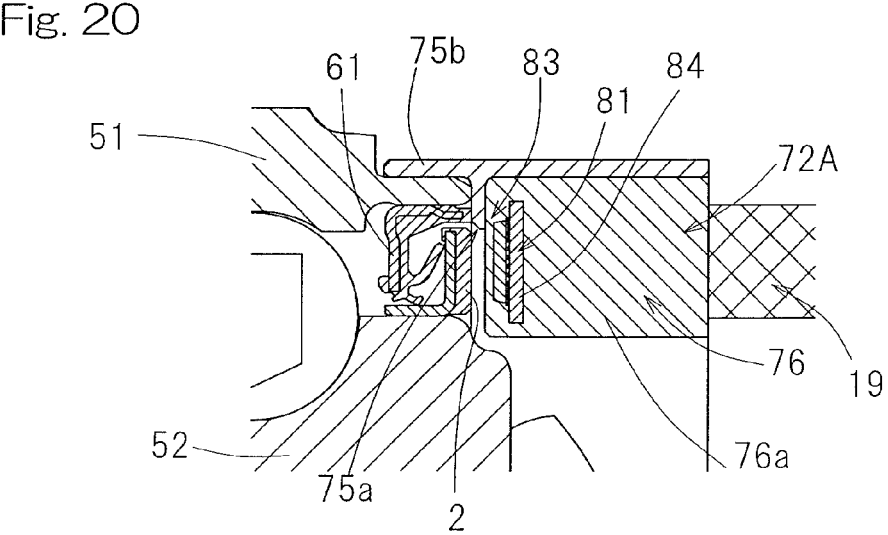
FIG. 20 is an enlarged sectional view of a portion enclosed by the circle XX in FIG. 18.

FIGS. 18 to 20 illustrate an example, in which the sensor and processing circuit mounted component 81 shown in and described with particular reference to FIG. 14 is arranged on the wheel support bearing assembly for the support of the vehicle drive wheel. The structure of the wheel support bearing assembly excluding the sensor system is similar to the wheel support bearing assembly previously described with particular reference to FIG. 8. In this embodiment, since the wheel support bearing assembly for the support of the vehicle drive wheel is employed, in which a constant velocity universal joint (not shown) is connected in the center bore of the inner member 52, in order to avoid an undesirable interference with the wheel support bearing assembly a ring shaped sensor mounting member 72A is employed. The sensor mounting member 72A is of a structure similar to the cap 74A employed in the practice of the embodiment shown in and described with reference to FIGS. 15 to 17 and excluding the plate lid portion 76b, and the resinous member 76 is comprised of only the annular molding material portion 76a and the cable 19 is drawn out to the outside from the molding material portion 76a. Other structural features of the sensor mounting member 72A are similar to those of the cap 74A shown in and described with particular reference to FIGS. 15 to 17.

Figure 21:
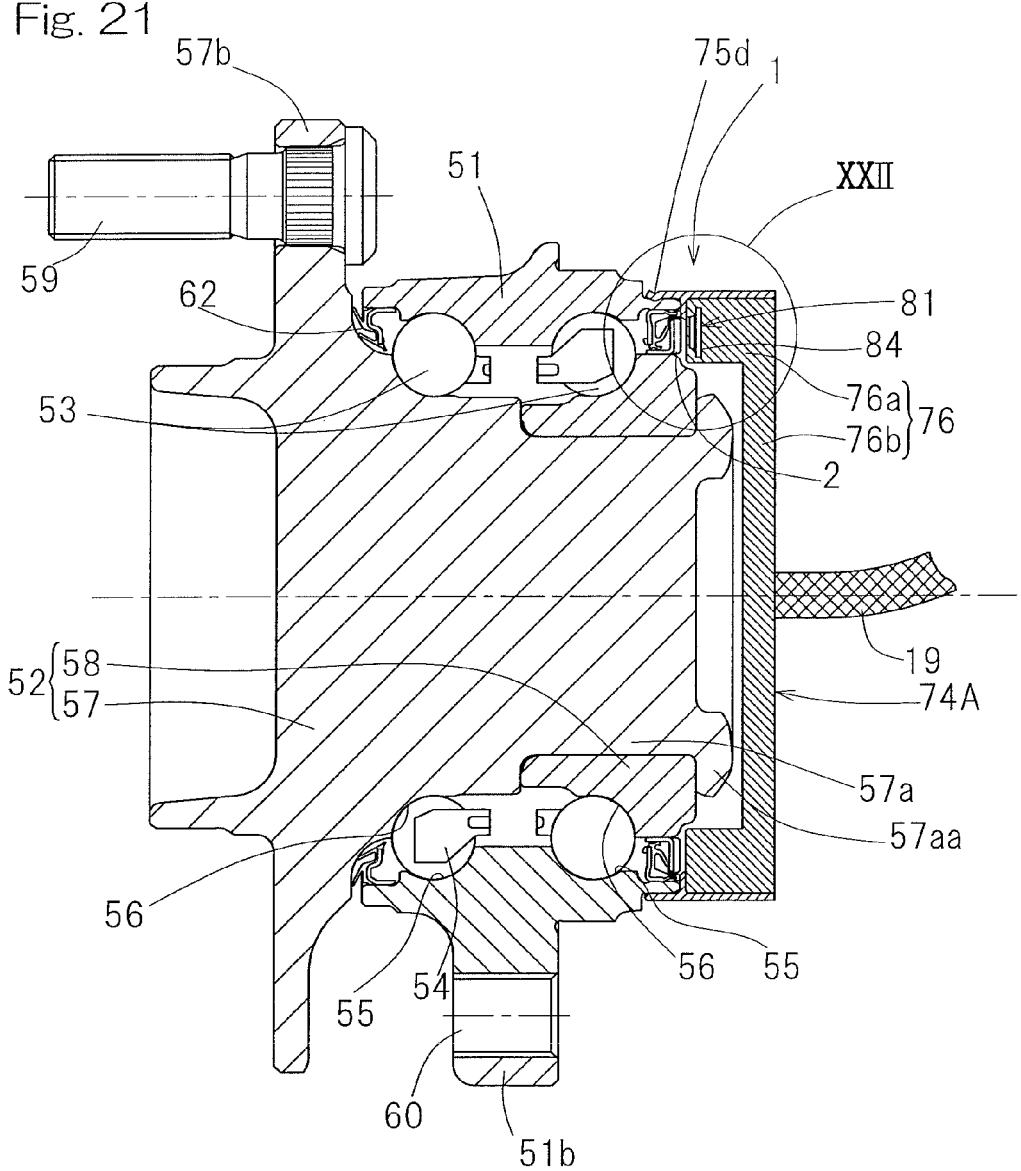
FIG. 21 is a sectional view showing a yet further example of the structure of the rotation detecting device equipped wheel support bearing assembly equipped with the rotation detecting device having the arcuate substrate shown in FIG. 14.
Figure 22:
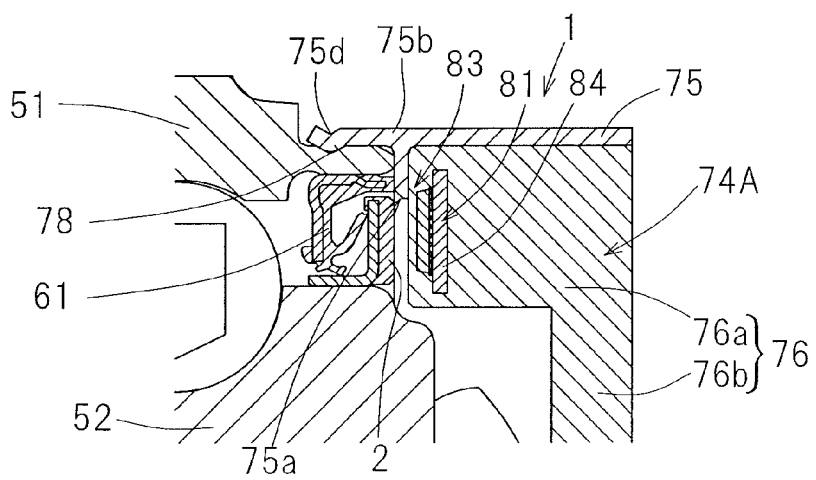
FIG. 22 is an enlarged sectional view of a portion enclosed by the circle XXII in FIG. 21.
Figure 23:
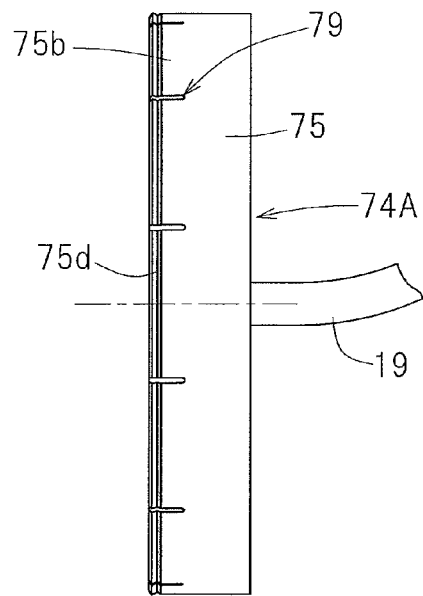
FIG. 23 is a front elevational view showing a modified form of a cap employed in the rotation detecting device equipped wheel support bearing assembly.

FIGS. 21 and 22 illustrate an example, in which in the wheel support bearing assembly shown in and described with particular reference to FIGS. 15 to 17, the mounting structure of the cap 74A, which serves as a sensor cap, is modified. In this example, the mounting portion 75b in the core metal 75 of the cap 74A, which is mounted on the outer peripheral surface of the outer member 51, is provided with an annular engagement projection 75d protruding radially inwardly and an annular engagement recess 78 engageable with the engagement projection 75d is provided in the outer periphery of the outer member 51. The engagement projection 75d is provided in the vicinity of a tip end of the core metal 75. The engagement projection 75d is a press molded article in the form of an arcuate sectioned groove having its rear side recessed. This engagement projection 75d has such a height that, when the cylindrical portion of the core metal 75 is elastically deformed in a direction radially outwardly, the core metal 75 can be press fitted onto the outer member 51, and by press fitting the core metal 75 until the engagement projection 75d is brought to the same axial position as the engagement recess 78, it is engaged in the engagement recess 78 as a result of restoration from the previously described elastic deformation. Other structural features in this example are similar to those shown in and described with particular reference to FIGS. 15 to 17.

Where as hereinabove described the use is made of the engagement projection 75d and the engagement recess 78, the cap 74A can be axially fixed relative to the outer member 51. Thereby, even when during the travel of the automotive vehicle vibrations are generated and/or a large load is loaded on the outer member 51 to result in deformation, the cap 74A including the sensor 3 can be firmly fixed to the outer member 51 and, accordingly, displacement relative to the outer member 51 may be avoided. Accordingly, for a prolonged period of time an air gap between the magnetic encoder 2 and the sensor 3, best shown in FIGS. 3A and 3B, of the rotation detecting device 1 can be maintained at an initially preset condition and the reliability of the rotation detection of the vehicle wheel increases accordingly.

It is to be noted that the mounting portion 75b of the core metal 75 in the cap 74A, which is engaged on the outer member 51, may be provided with a plurality of circumferentially equidistantly spaced slits 79a each extending in a direction axially thereof. Where the slits 79 are employed in this way, the mounting portion 75b of the core metal 75 can readily undergo an elastic deformation during the assemblage and, hence, even when the amount of protrusion of the engagement projection 75d is set to be large, the sensor cap 74A can be easily press fitted around the outer member 51 and, therefore, the fixing force of the sensor cap 74A relative to the outer member 51 can be further increased.

Figure 24A:
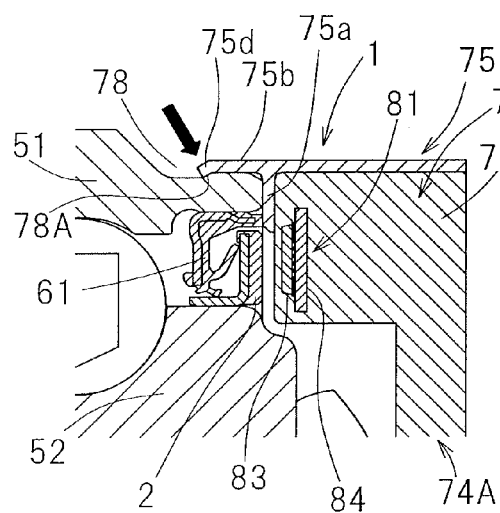
FIG. 24A is a fragmentary enlarged sectional view showing a modified form of a cap mounting structure employed in the rotation detecting device equipped wheel support bearing assembly.
Figure 24B:
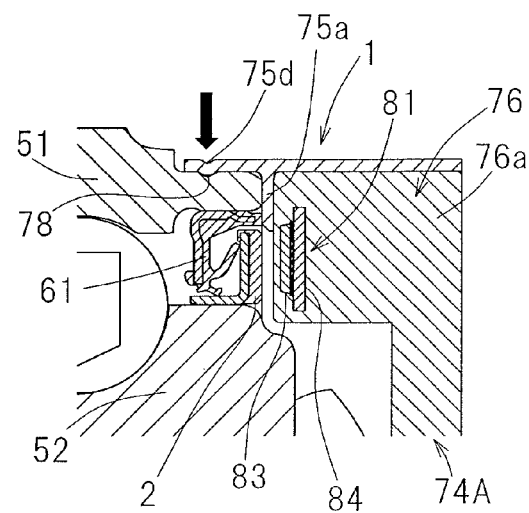
FIG. 24B is a fragmentary enlarged sectional view showing a modified form of a cap mounting structure employed in the rotation detecting device equipped wheel support bearing assembly.

Although in the example described above the engagement projection 75d referred to above is molded beforehand during the manufacture of the sensor cap 74A, after the core metal 75 has been press fitted onto the outer member 51, it may be formed as a crimped portion by applying a pressure from an outer periphery to cause a plastic deformation as shown in FIG. 24B. Where the engagement projection 75d is formed beforehand during the manufacture of the cap 74A, assemblage of the cap 74A onto the outer member 51 can be accomplished through one-touch operation, thus simplifying the assemblability. It is, however, to be noted that to avoid an obstruction to the press fitting the height of the engagement projection 25b need be reduced. On the other hand, where the engagement projection 75d is rendered to be the crimped portion that has been plastically deformed after the press fitting of the core metal 75, the amount of protrusion of the engagement projection 75d can be suitably changed without constituting any obstruction to the press fitting and, hence, the fixing force of the sensor cap 74A can be further strengthened.

It is also to be noted that where the engagement projection 75d is rendered to be the crimped portion that has been plastically deformed after the press fitting of the core metal 75, the engagement projection 75d may have such a shape that as shown in FIG. 24A an open edge of the mounting portion 75d of the core metal 75 is plastically deformed slantwise radially inwardly. In such case, the outer periphery of the outer member 51 may be so designed that instead of the provision of the engagement recess 78 comprised of a circumferentially extending local groove as shown in FIG. 24B, a portion of a core metal mounting surface of the outer member 51 neighboring the outboard side may be rendered to be a stepped face portion 78A that is slantwise depressed as shown in FIG. 24A. Attention is called that a portion of the outer peripheral surface of the outer member 51 remote from the core metal mounting surface has a diameter greater than that of the core metal mounting surface and a side edge portion of the engagement recess 78 becomes the stepped face portion 78A.

Figure 25:
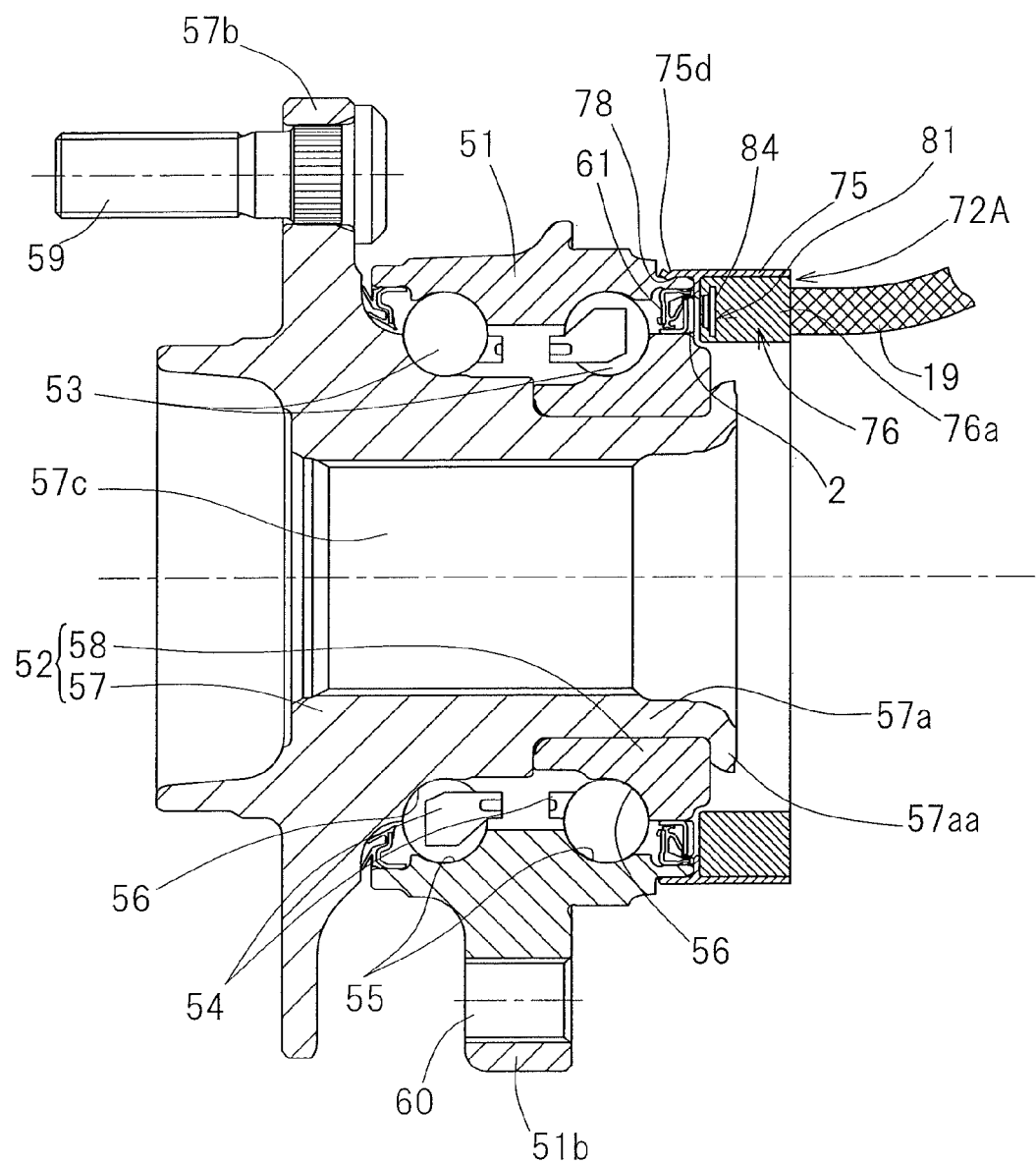
FIG. 25 is a sectional view showing a yet further example of the rotation detecting device equipped wheel support bearing assembly utilizing the cap.

The structure of the engagement projection 75d and the engagement recess 78, shown in and described with particular reference to FIG. 21 to FIGS. 24A and 24B, can be adopted to the wheel support bearing assembly for the support of the vehicle drive wheel. FIG. 25 illustrates an example, in which the engagement projection 75d and the engagement of recess 78 shown in any one of FIG. 21 to FIGS. 24A and 24B are provided in the wheel support bearing assembly for the support of the vehicle drive wheel shown in and described with particular reference to FIG. 18.

Figure 26:
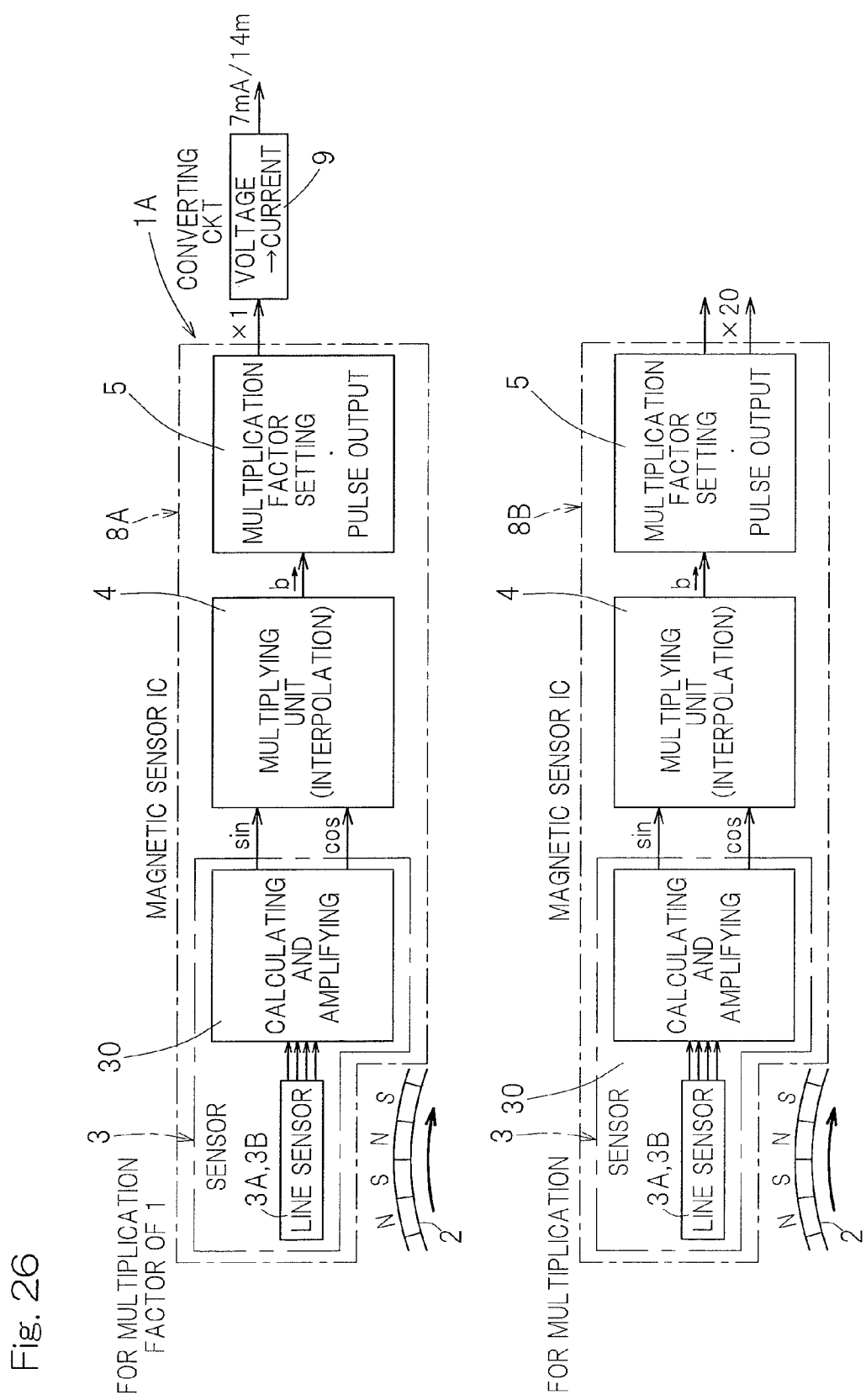
FIG. 26 is a block diagram showing a schematic structure of the rotation detecting device according to a fourth preferred embodiment of the present invention.
Figure 27:
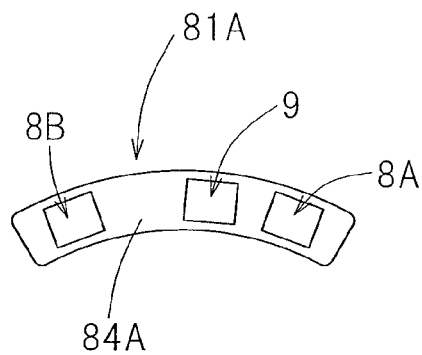
FIG. 27 is a front elevational view showing the relationship between the arcuate substrate and the integrating circuit having the multiplying unit and the sensor in the rotation detecting device.

A fourth preferred embodiment is shown in FIGS. 26 and 27. Referring now to FIGS. 26 and 27, the rotation detecting device 1A shown therein is of a type in which two magnetic sensor integrated circuits 8A and 8B, each being the integrated circuit made up of the sensor 3, the multiplying unit 4 and the pulse outputting unit 5, are employed. Each of those magnetic sensor integrated circuits 8A and 8B is comprised of an IC chip. One of the magnetic sensor integrated circuit 8A is for the multiplying power of 1 whereas the other of the magnetic sensor integrated circuit 8B is for multiplication. Those two magnetic sensor integrated circuits 8A and 8B are of a type having a multiplying power of the output pulse that is capable of being set from the outside of the integrated circuit and, using the magnetic sensor integrated circuits of the same specification, the respective preset multiplying powers of the output pulses are differentiated from each other. The preset multiplying power of the output pulse may be, other than being semi-fixed, arbitrarily adjustable by a signal from the outside by means of, for example, the multiplying power changing unit 7 previously described with particular reference to FIG. 1. It is to be noted that although in FIG. 26 the encoder 2 is shown in two in number to suit to the use of the two magnetic sensor integrated circuits 8A and 8B, the use of the two encoders is only for the purpose of illustration and only one encoder 2 is employed while the magnetic sensor integrated circuits 8A and 8B are arranged at respective positions of phases different from each other in face to face relation with the common encoder 2. The encoder 2 is the magnetic encoder shown in and described with particular reference to FIGS. 2A and 2B or FIGS. 3A and 3B.

The sensor 3 in each of the magnetic sensor integrated circuits 8A and 8B is identical with that shown in and described with particular reference to FIG. 1 to FIGS. 4A and 4C and includes the line sensors 3A and 3B and the calculation amplifying unit 30 shown in FIGS. 4A to 4C. The multiplying unit 4 is of a structure shown in and described with particular reference to FIGS. 1 and 5.

The pulse outputting unit 5 is capable of outputting the rotation pulses of at least two different multiplying powers from the multiplication pulse b, which is the phase data within the to-be-detected pole (magnetic pole pair) 2c which are inputted from the multiplying unit 4. The pulse outputting unit 5 is rendered to be capable of presetting, from the outside of the magnetic sensor integrated circuits 8A and 8B, which one of the rotation pulses having the different multiplying powers is to be outputted at what multiplying power. The pulse outputting unit 5 is rendered to be capable of outputting the rotation pulse of the multiplying power (×20) with the multiplication factor N if the multiplication factor N in the multiplying unit 4 is, for example, 20, and the rotation pulse (one rotation pulse for one magnetic pole pair of the encoder 2) of a predetermined multiplying power smaller than the multiplication factor N, for example, the multiplying power of 1 (×1) by frequency dividing the multiplication pulse b. In the instance now under discussion, in the magnetic sensor integrated circuit 8A for the multiplying power of 1, the multiplying power outputted by the pulse outputting unit 5 is set to a multiplying power of 1, but in the magnetic sensor integrating circuit 8B for multiplication, the multiplying power outputted by the pulse outputting unit 5 is set to a multiplying power of 10 or 20. It is to be noted that although the magnetic sensor integrated circuit 8B has been shown and described as employed in one in number in the example as shown, a plurality of magnetic sensor integrated circuits 8B for multiplication may be employed and the multiplying powers outputted thereby may be differentiated from each other.

In the stage following the magnetic sensor integrated circuit 8A for the multiplying power of 1, the voltage to electric current converting circuit 9 for converting the pulse output into an electric current output is connected. The voltage to electric current converting circuit 9 outputs, as an electric current output, a pulse signal of 7 mA in electric current value and a pulse signal of 14 mA in electric current value alternately. Accordingly, it is possible to accommodate an input signal mode of the process control device for processing the output signal of the rotation detecting device 1. The voltage to electric current converting circuit 9 is constructed of, for example, a one chip integrated circuit.

FIG. 27 illustrates one example of the sensor and processing circuit mounted component 81A of such a circuit configuration as shown in FIG. 1. This sensor and processing circuit mounted component 81A is of a type in which the two magnetic sensor integrated circuits 8A and 8B and the voltage to electric current converting circuit 9 are arranged on a single arcuate substrate 84A, which is a printed circuit substrate, in a direction circumferentially thereof. The arcuate substrate 84 is of a type that is arranged in axially face to face relation with the magnetic encoder 2 of the axial type such as shown in and described with particular reference to FIGS. 3A and 3B, and is of an arcuate shape extending like a strip in a circumferential direction in a coaxial relation with the center of the magnetic encoder 2.

According to the rotation detecting device 1 according to this embodiment described above, as is the case with that according to any one of the previously described embodiments of the present invention, the sensor 3 is of the structure in which a plurality of sensor elements 3a such as shown in FIG. 4A are arranged in a line, and such an output as shown in FIG. 4B, which changes at one cycle relative to one magnetic pole pair of the magnetic encoder 2 can be obtained. In other words, by the calculation of respective outputs of the plural sensor elements 3a, an waveform output of a kind having a minimized strain and less affected by noises can be obtained. From this waveform output, the phase within the magnetic poles can be detected by the multiplying unit 4.

From the magnetic sensor integrated circuit 8A for the multiplying power of 1, one pulse is outputted to one magnetic pole pair of the magnetic encoder 2 and, since it is the same as an input signal of the conventional ABS control device, it can be used for the ABS control as it stands. Also, since the voltage to electric current converting circuit 9 is provided, the input suitable to the input mode of the ABS control device can be obtained. To the high magnifying power output from the magnetic sensor integrated circuit 8B for the multiplication the rotation pulse having a resolving power of the magnifying power of, for example, 10 or 20 is outputted and inputted to a vehicle control device utilizing the rotation signal of a further high resolving power.

While pulse outputs of the multiplying power of 1 and of a high multiplying power can be obtained as hereinabove described, since using the two magnetic sensor integrated circuits 8A and 8B of the same specification, only the preset magnifying powers are differentiated, the number of types of component parts used is reduced as compared with that in the case where two types of integrated circuits such as the integrated circuit having no multiplying unit and the integrated circuit having the multiplying unit and, consequently, it leads to a reduction in cost. Also, since the two magnetic sensor integrated circuits 8A and 8B and the voltage to electric current converting circuit 9 are disposed on the same arcuate substrate 84, the rotation detecting device 1 as a whole can be constructed compact and, hence, the various circuits and the sensor element unitary component can be arranged in a limited available space.

Figure 28:
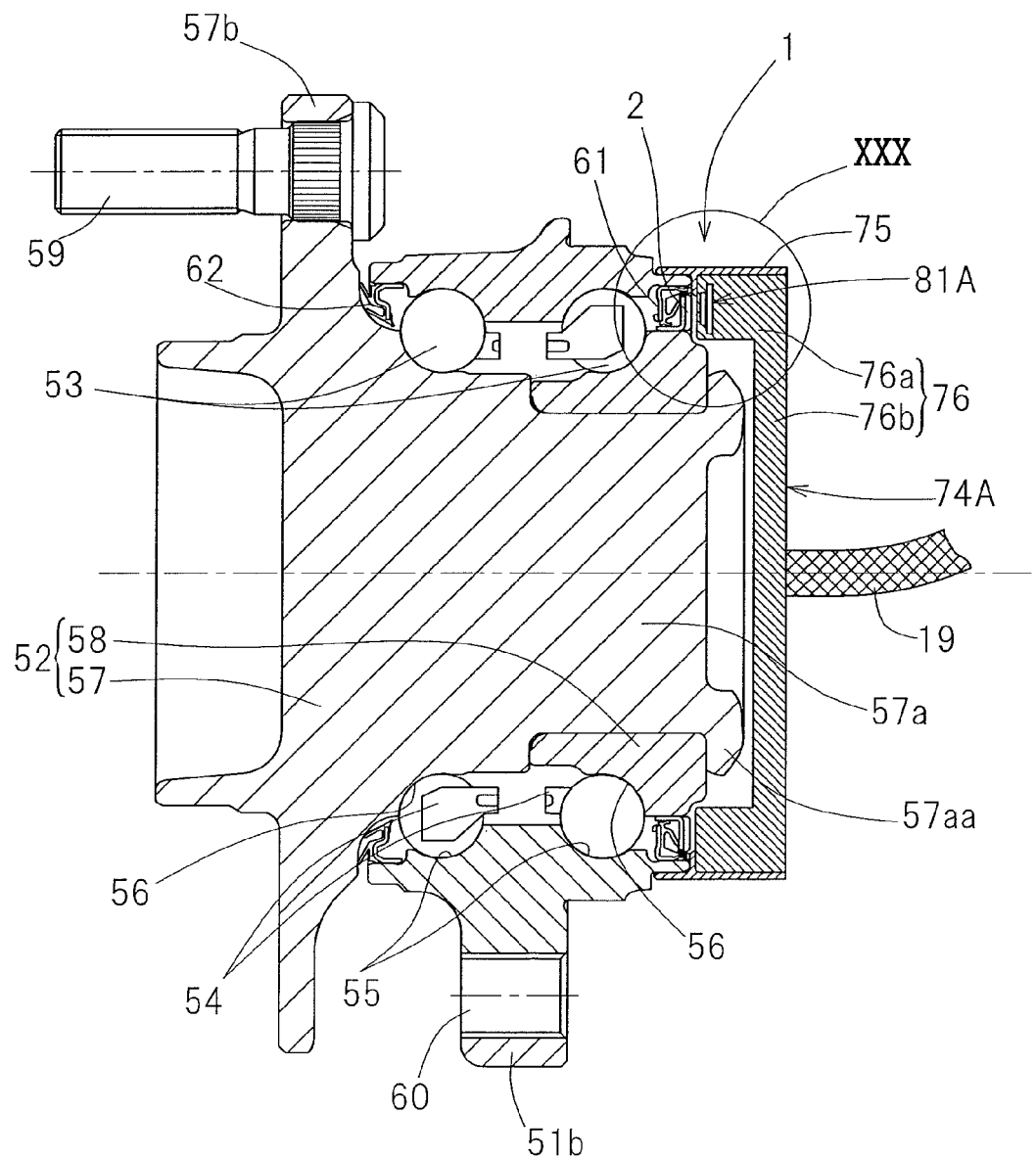
FIG. 28 is a sectional view showing one example of the rotation detecting device equipped wheel support bearing assembly equipped with the rotation detecting device of the structure shown in FIGS. 26 and 27.
Figure 29:
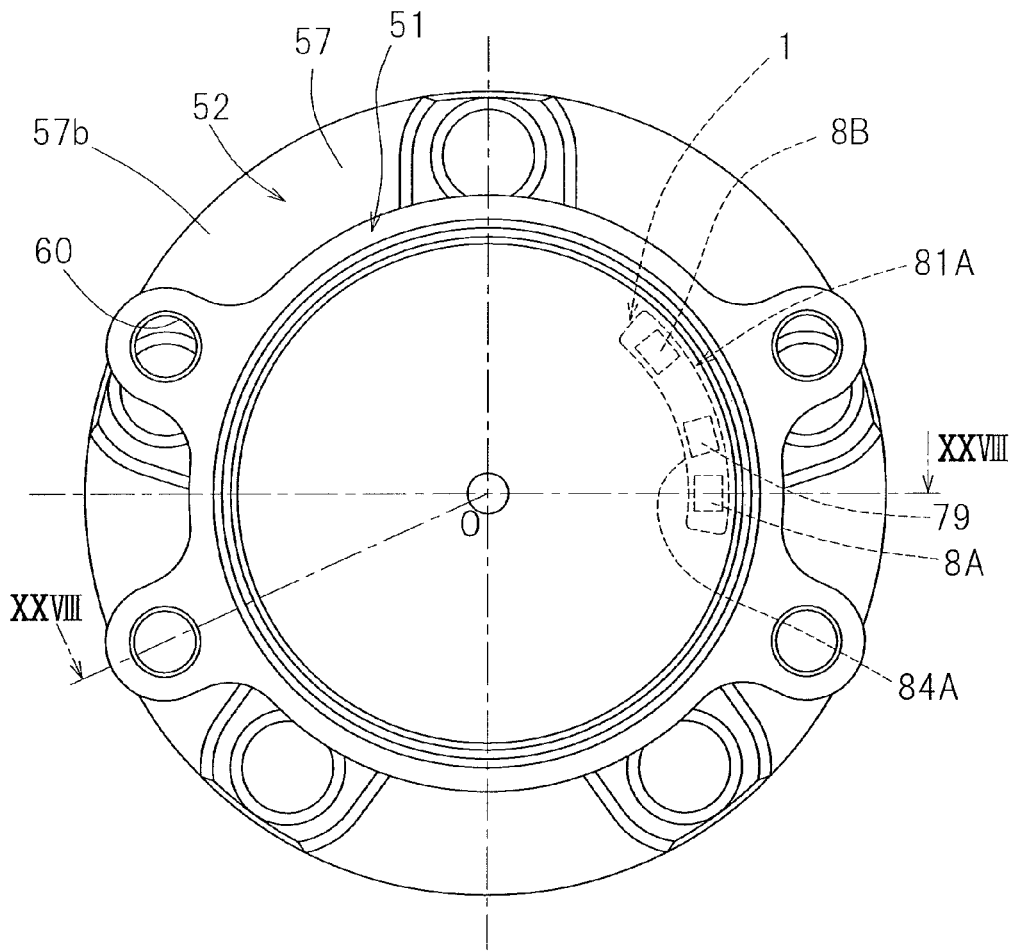
FIG. 29 is a side view showing the rotation detecting device equipped wheel support bearing assembly as viewed from the inboard side.
Figure 30:
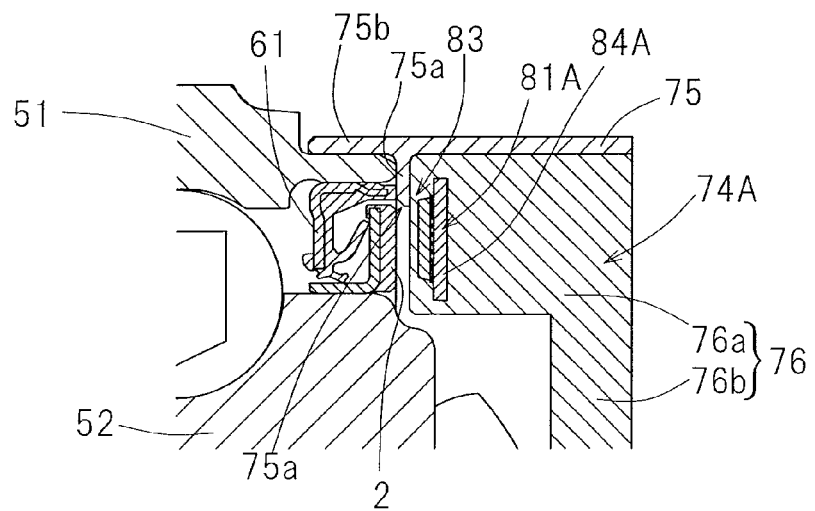
FIG. 30 is an enlarged sectional view showing that portion enclosed by the circle XXX in FIG. 28.

FIGS. 28 to 30 illustrates one example of the wheel support bearing assembly for a passive wheel, which is equipped with the sensor and processing circuit mounted component 81 shown in and described with particular reference to FIG. 27. FIG. 28 is a cross sectional representation taken along the line XXVIII-XXVIII in FIG. 29. This wheel support bearing assembly is such that in the embodiment shown in and described with particular reference to FIGS. 15 to 17, in place of the use of the sensor and processing circuit mounted component 81 shown in and described with particular reference to FIG. 14, the sensor and processing circuit mounted component 81A shown in and described with particular reference to FIG. 17 is employed. This sensor and processing circuit mounted component 81A is, as is the case with the sensor and processing circuit mounted component 81 shown in FIG. 14, molded in the molding material portion 76a of the resinous member 76 of the cap 74A. Other structural features are similar to those in the embodiment shown in and described with particular reference to FIGS. 15 to 17.

According to the wheel support bearing assembly of the construction described above, since the sensor and processing circuit mounted component 81A having the magnetic sensor integrated circuits 8A and 8B and the voltage to electric current converting circuit 9 mounted on the arcuate substrate 84A is employed, the rotation detecting device 1 as a whole can be constructed compact and, hence, the various circuits and the sensor 3 can be arranged in a limited available space. Also, since the sensor and processing circuit mounted component 81A is embedded in the molding material portion 76a, a water proofing and an impact resistance can be secured. Since a portion of the cap 74A that is press fitted becomes a portion of the core metal 75 having a high rigidity, it is excellent in proof strength against separation.

Figure 31:
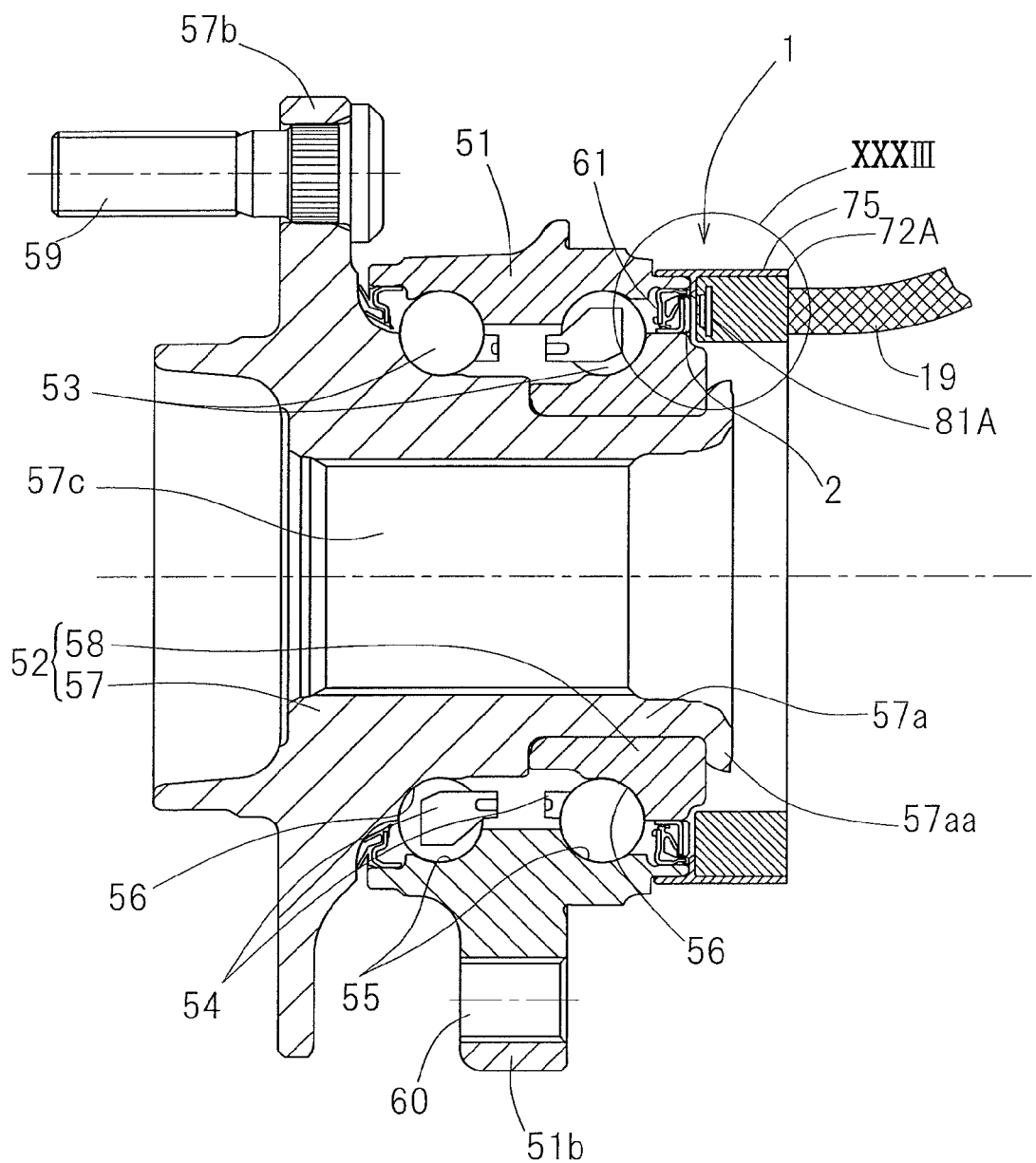
FIG. 31 is a sectional view showing a different example of the structure of the rotation detecting device equipped wheel support bearing assembly equipped with the rotation detecting device.
Figure 32:
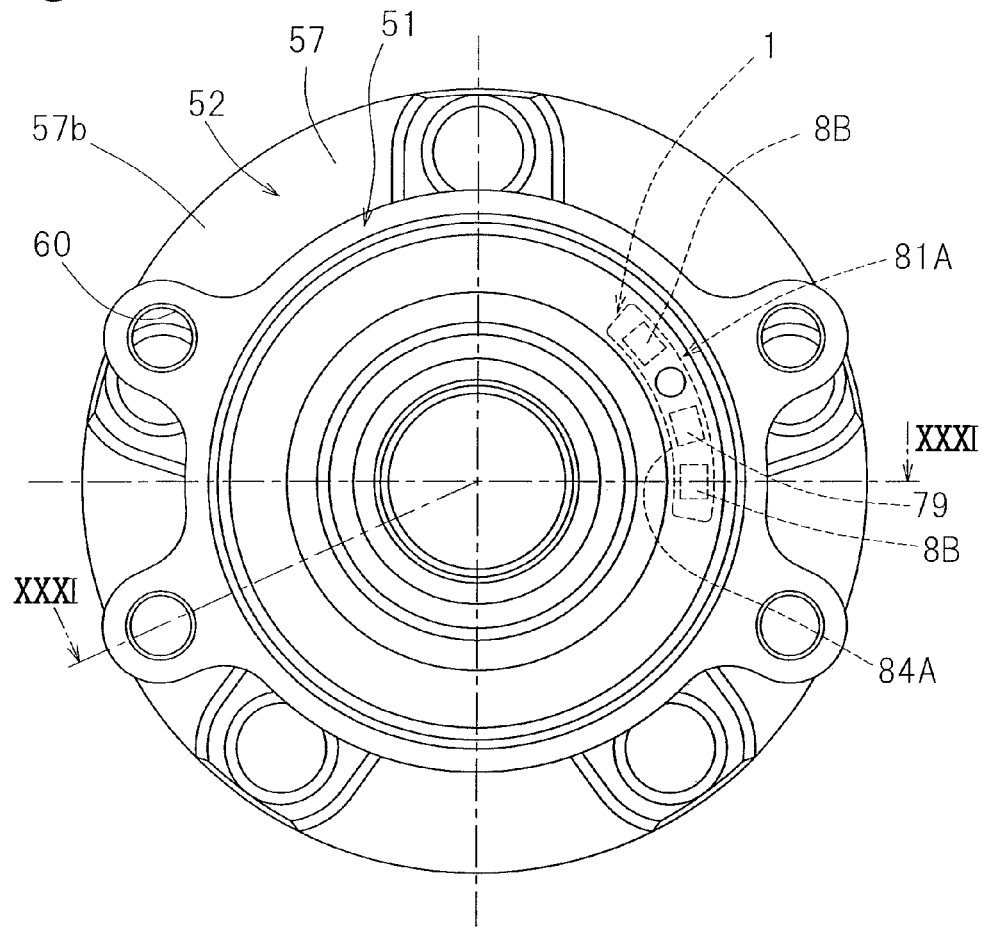
FIG. 32 is a side view showing the rotation detecting device equipped wheel support bearing assembly as viewed from the inboard side.
Figure 33:
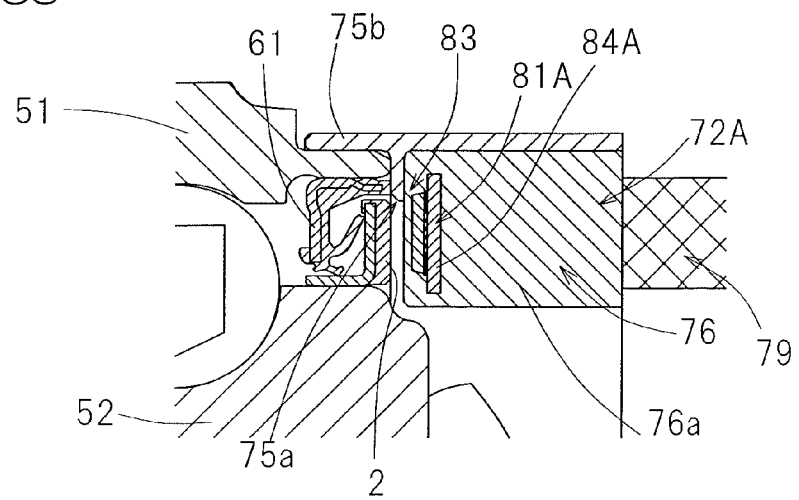
FIG. 33 is an enlarged sectional view of a portion enclosed by the circle XXXIII in FIG. 31.
Figure 34:
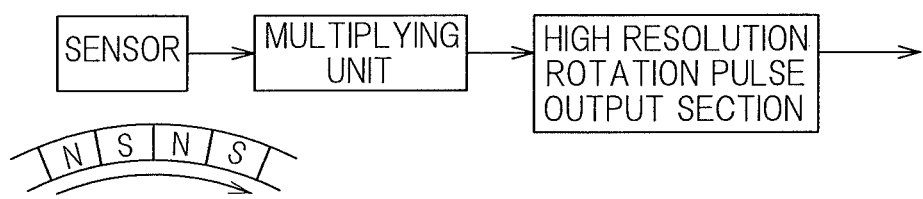
FIG. 34 is a block diagram showing a schematic structure of the prior art example.

FIGS. 31 to 33 are such that in the wheel support bearing assembly for the support of the vehicle drive wheel shown in and described with particular reference to FIGS. 18 to 20, instead of the use of the sensor and processing circuit mounted component 81 shown in and described with reference to FIG. 14, the sensor and processing circuit mounted component 81A shown in and described with reference to FIG. 27 is employed. This sensor and processing circuit mounted component 81A is, as is the case with the sensor and processing circuit mounted component 81 shown in FIG. 14, molded in the molding material portion 76a of the resinous member 76 of the sensor mounting member 72A. Other structural features are similar to those in the embodiment shown in and described with particular reference to FIGS. 18 to 20.

In the wheel support bearing assembly according to the embodiment shown in and described with reference to FIGS. 28 to 30 or to the embodiment shown in and described with reference to FIGS. 28 to 30, the engagement structure afforded by the engagement projection 75d and the engagement recess 78 shown in and described with reference to FIG. 21 to FIGS. 24A and 24B and the slits 79 or the like may be adopted.

It is to be noted that although in describing the wheel support bearing assembly employed in the various preferred embodiments of the present invention reference has been made to the wheel support bearing assembly of the third generation type, the present invention can be equally applied to any wheel support bearing assembly of first and second generation types, in which the hub and the bearing are provided separately and also to the wheel support bearing assembly of the fourth generation type in which the inner member is comprised of a hub axle and an outer ring of the constant velocity universal joint. Also, it can be applied not only to the angular contact ball bearing type, but also to any wheel support bearing assembly of various types. In addition, the to-be-detected member in the rotation detecting device 1 may not be always limited to the magnetic encoder, but may be, for example, a serrated pulsar ring made of a metallic material.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

REFERENCE NUMERALS

1 . . . Rotation detecting device
2 . . . Encoder
3 . . . Sensor
4 . . . Multiplying unit
5, 5A, 5B . . . Pulse outputting unit
6A, 6AA, 6AB, 6B . . . High resolution rotation pulse output section
6C, 6C' . . . Ordinary pulse output section
7 . . . Multiplying power changing unit
8 . . . Integrated circuit
8A, 8B . . . Magnetic sensor integrated circuit
9 . . . Voltage to electric current converting circuit
72, 72A . . . Sensor mounting member
74, 74A . . . Cap
76 . . . Resinous member
76a . . . Molding material portion
81, 81A . . . Sensor and processing circuit mounted component
82 . . . Sensor element unitary component
83 . . . Multiplication processing integrated circuit
84, 84A . . . Arcuate substrate

What is claimed is:

1. A rotation detecting device provided in a bearing assembly comprising:
    an annular encoder provided rotatably and having a plurality of to-be-detected poles circumferentially equidistantly arranged therein;
    a sensor for detecting the to-be-detected poles of the encoder;
    a pulse outputting unit including an ordinary output section for outputting pulses, obtained from a detection output of the sensor, without passing through a multiplying unit, and a high resolution pulse output section for outputting pulses generated from the output of the multiplying unit; and
    a cap to cover an end face opening of an outer member of the bearing assembly,
    wherein the pulse outputting unit is adapted to receive an output of the multiplying unit or both an output of the multiplying unit and a detection output of the sensor and is capable of outputting pulses of at least two types of magnifying powers that are different from each other,
    the multiplying unit is configured to multiply a phase of the to-be-detected poles based on an output of the sensor,
    the cap includes
        a cylindrical core metal fitted onto an end outer periphery of the outer member; and
        a molding material portion, provided on an inner periphery of the core metal, in which the sensor is embedded, and
    the core metal includes
        a positioning upright wall member protruding radially inwardly thereof to abut an end face of the outer member;
        a mounting portion in the form of a cylindrical portion protruding towards an outboard side beyond the positioning upright wall member;
        an annular engagement projection protruding radially inwardly thereof in the form of an arcuate sectioned groove with its rear side being recessed, provided in the mounting portion and at a location axially spaced from an opening edge of the mounting portion; and
        a plurality of slits formed in the mounting portion so as to be spaced circumferentially equidistantly and extend axially, and
    wherein the outer member is formed with, in an outer periphery thereof, an engagement recess configured to engage the engagement projection, and
    wherein the opening edge of the mounting portion has an inner diameter substantially equal to an outer diameter of the end outer periphery of the outer member.

2. The rotation detecting device as claimed in claim 1, further comprising a multiplying power changing unit for changing from the outside a multiplying power of the pulses to be outputted by the pulse outputting unit.

3. The rotation detecting device as claimed in claim 1, wherein the number of the encoder is one and a detection output of the sensor that detects the to-be-detected poles of the encoder is inputted to the multiplying unit.

4. The rotation detecting device as claimed in claim 1, wherein the encoder is a magnetic encoder.

5. The rotation detecting device as claimed in claim 1, wherein the sensor includes a line sensor having sensor elements arranged along a direction of arrangement of the to-be-detected poles of the encoder and, generates two sinusoidal signals of different phases through calculation to detect a phase within one to-be-detected pole.

6. The rotation detecting device as claimed in claim 1, wherein the pulse of at least one type of the multiplying power generated by the pulse outputting unit, is rendered to be a phase difference signal of A and B phases displaced 90° in phase relative to each other.

7. The rotation detecting device as claimed in claim 1, wherein the sensor, the multiplying unit and the pulse outputting unit are integrated in a common integrated circuit, and
the pulse outputting unit is configured to simultaneously output the pulses of at least two types of magnifying powers that are different from each other.

8. The rotation detecting device as claimed in claim 7, wherein the integrated circuits are covered by a molding material.

9. The rotation detecting device as claimed in claim 8, wherein the molding material is a resin.

10. The rotation detecting device as claimed in claim 1, wherein the sensor includes a sensor element unitary component which is in its entirety integrated; the multiplying unit and the pulse outputting unit are integrated in a common integrated circuit; and the integrated circuit having the multiplying unit and the sensor element unitary component are arranged circumferentially on and mounted on an arcuate substrate confronting axially the encoder and formed as a printed circuit substrate extending in the form of a strip in a direction along a circumferential direction coaxial with the center of the encoder.

11. The rotation detecting device as claimed in claim 1, further comprising a voltage to electric current converting circuit for converting one of pulses outputted by the pulse outputting unit, such one of the pulses having the smallest multiplication factor of all those pulses, into an electric current output.

12. The rotation detecting device as claimed in claim 11, wherein the voltage to electric current converting circuit alternately outputs the electric current output in the form of a pulse signal of 7 mA in current value and a pulse signal of 14 mA in current value.

13. A rotation detecting device equipped bearing assembly having incorporated therein the rotation detecting device as defined in claim 1.

14. The rotation detecting device equipped bearing assembly as claimed in claim 13, in which the bearing assembly is a wheel support bearing assembly for supporting a vehicle driven wheel and further comprising a cap for covering the sensor.

15. The rotation detecting device equipped bearing assembly as claimed in claim 13, wherein the bearing assembly is a wheel support bearing assembly for supporting a vehicle drive wheel, and a bearing end portion of a bearing space, delimited between an outer member and an inner member rotatable relative to each other through rolling elements, is sealed by a sealing device, the sensor being provided at a location inwardly of the bearing with respect to the sealing device.

16. A rotation detecting device provided in a bearing assembly comprising:
an annular encoder provided rotatably and having a plurality of to-be-detected poles circumferentially equidistantly arranged therein;
a sensor for detecting the to-be-detected poles of the encoder; and
a cap to cover an end face opening of an outer member of the bearing assembly,
wherein the encoder is a magnetic encoder, and a plurality of integrated circuits including a sensor for detecting the to-be-detected poles of the magnetic encoders, and a pulse outputting unit including an ordinary output section for outputting pulses, obtained from a detection output of the sensor, without passing through a multiplying unit, and a high resolution pulse output section for outputting pulses generated from the output of the multiplying unit,
wherein the pulse outputting unit is adapted to receive an output of the multiplying unit or both an output of the multiplying unit and a detection output of the sensor and is capable of outputting pulses of at least two types of magnifying powers that are different from each other,
wherein the multiplying unit is configured to multiply a phase of the to-be-detected poles based on an output of the sensor,
wherein the cap includes
a cylindrical core metal fitted onto an end outer periphery of the outer member; and
a molding material portion, provided on an inner periphery of the core metal, in which the sensor is embedded, and
wherein the core metal includes
a positioning upright wall member protruding radially inwardly thereof to abut an end face of the outer member;
a mounting portion in the form of a cylindrical portion protruding towards an outboard side beyond the positioning upright wall member;
an annular engagement projection protruding radially inwardly thereof in the form of an arcuate sectioned groove with its rear side being recessed, provided in the mounting portion and at a location axially spaced from an opening edge of the mounting portion; and
a plurality of slits formed in the mounting portion so as to be spaced circumferentially equidistantly and extend axially, and
wherein the outer member is formed with, in an outer periphery thereof, an engagement recess configured to engage the engagement projection, and
wherein the opening edge of the mounting portion has an inner diameter substantially equal to an outer diameter of the end outer periphery of the outer member.

17. The rotation detecting device as claimed in claim 16, wherein the integrated circuits are arranged circumferentially on and mounted on an arcuate substrate confronting axially the encoder and formed as a printed circuit substrate extending in the form of a strip in a direction along a circumferential direction coaxial with the center of the encoder.

* * * * *